(12) United States Patent
Olson et al.

(10) Patent No.: US 7,223,520 B2
(45) Date of Patent: May 29, 2007

(54) LIMITED PLAY OPTICAL MEDIA DEVICE WITH BARRIER LAYERS

(75) Inventors: Daniel Robert Olson, Voorheesville, NY (US); Marc Brian Wisnudel, Clifton Park, NY (US); Marc Schaepkens, Ballston Lake, NY (US); Robert Franklin Thompson, Kennebunk, ME (US)

(73) Assignee: General Electric Company, Schenectady, NY (US)

( * ) Notice: Subject to any disclaimer, the term of this patent is extended or adjusted under 35 U.S.C. 154(b) by 510 days.

(21) Appl. No.: 10/657,631

(22) Filed: Sep. 8, 2003

(65) Prior Publication Data
US 2004/0152013 A1    Aug. 5, 2004

Related U.S. Application Data

(60) Provisional application No. 60/444,431, filed on Feb. 3, 2003.

(51) Int. Cl.
*G11B 7/26* (2006.01)
(52) U.S. Cl. .................. 430/270.11; 430/945; 369/284
(58) Field of Classification Search ............... None
See application file for complete search history.

(56) References Cited

U.S. PATENT DOCUMENTS

| 3,635,895 A | 1/1972 | Kramer |
| 3,697,395 A | 10/1972 | Kehr et al. |
| 3,697,402 A | 10/1972 | Kehr et al. |
| 4,001,184 A | 1/1977 | Scott |
| 4,179,548 A | 12/1979 | Schroeter et al. |
| 4,217,438 A | 8/1980 | Brunelle et al. |
| 4,404,257 A | 9/1983 | Olson |
| 4,491,508 A | 1/1985 | Olson et al. |
| 5,815,484 A | 9/1998 | Smith et al. |
| 6,011,772 A | 1/2000 | Rollhaus et al. |

(Continued)

FOREIGN PATENT DOCUMENTS

JP    60-127542    *    7/1985

(Continued)

OTHER PUBLICATIONS

Larson et al., "Properties of radiation cured coatings", Intern. J. Rad Appl. Instrum. Part C, Rad. Phys & Chem. vol. 30(1) pp. 11-15.*

(Continued)

*Primary Examiner*—Martin Angebrannt
(74) *Attorney, Agent, or Firm*—Carter, DeLuca, Farrell & Schmidt LLP.

(57) ABSTRACT

The present disclosure relates to a limited play optical storage media and a method for limiting access to data thereon. This storage media includes a first substrate; a reflective layer; a data storage layer disposed between said first substrate and said reflective layer; a reactive layer comprising at least one reactive material disposed on said at least one reflective layer; an optically transparent second substrate disposed between the reactive layer and a laser incident surface of the optical storage media; and an oxygen permeable barrier layer disposed between the reactive layer and a laser incident surface of the optical storage media, said reactive layer having an initial percent reflectivity of about 50% or greater and a percent reflectivity of about 45% or less after exposure to oxygen.

31 Claims, 8 Drawing Sheets

U.S. PATENT DOCUMENTS

| | | | |
|---|---|---|---|
| 6,338,933 | B1 | 1/2002 | Lawandy et al. |
| 6,343,063 | B1 | 1/2002 | Rollhaus et al. |
| 6,790,501 | B2 * | 9/2004 | van de Grampel et al. 428/64.1 |
| 6,866,909 | B2 * | 3/2005 | Wisnudel et al. .......... 428/64.1 |
| 2003/0002431 | A1 | 1/2003 | Breitung et al. |
| 2003/0198892 | A1 * | 10/2003 | Ezbiansky et al. ..... 430/270.14 |
| 2003/0205323 | A1 * | 11/2003 | Ezbiansky et al. .......... 156/310 |
| 2005/0053865 | A1 * | 3/2005 | Wisnudel et al. ...... 430/270.15 |

FOREIGN PATENT DOCUMENTS

| | | | |
|---|---|---|---|
| JP | 60-256944 | * | 12/1985 |
| JP | 60-261046 | * | 12/1985 |
| WO | 02/075733 | * | 9/2002 |

OTHER PUBLICATIONS

Sax et al., "Permeabilities of radiation cured marterials", Intern. J. Rad Appl. Instrum. Part C, Rad. Phys & Chem. vol. 31(4-6) pp. 887-896.*

Encyclopedia of polymer Science and Technology, vol. 1, Interscience Publishers, John Wiley & Sons, Inc., 246-328 (1964) and references cited therein.

Pauly, S., "Permeability and Diffusion Data," Encyclopedia of Polymer Science vol. VI, 563-569.

* cited by examiner

Comparison of Kinetics of Samples With and Without Barrier Coating

- ─□─ A. no topcoat
- ─◇─ B. topc cured 6s after (6s total)
- ⋯△⋯ C. topc cured 24s after (24s total)
- ─◆─ D. topc cured 6sec before (12s total)
- ─▲─ E. topc cured 24s before (30 total)

Limited-play "reverse-mastered" DVD-5
with reactive dye in adhesive and topical barrier coating Limited-play "reverse-mastered" DVD-5
with reactive dye coating and topical barrier coating Limited-play "reverse-mastered" DVD-5
with reactive dye coating and topical barrier coating Limited-play "reverse-mastered" DVD-5
with reactive dye in adhesive and barrier layer Limited-play "reverse-mastered" DVD-5
with reactive dye in adhesive and barrier layer Limited-play "reverse-mastered" DVD-5
with reactive dye coating and barrier layer Limited-play DVD-9 with topical barrier coating Limited-play DVD-9 with internal barrier coating

LIMITED PLAY OPTICAL MEDIA DEVICE WITH BARRIER LAYERS

This application claims priority to U.S. Provisional Application No. 60/444,431 filed Feb. 3, 2003, the contents of which are incorporated by reference herein.

BACKGROUND OF THE INVENTION

This disclosure relates to novel limited play storage media with limited playability to minimize the risk of loss of intellectual property.

Optical, magnetic and magneto-optic media are primary sources of high performance storage technology which enables high storage capacity coupled with a reasonable price per megabyte of storage. Use of optical media has become widespread in audio, video, and computer data applications in such formats as compact disk (CD), digital versatile disk (DVD) including multi-layer structures like DVD-5, DVD-9, and multi-sided formats such as DVD-10, and DVD-18, magneto-optical disk (MO), and other write-once and re-writable formats such as CD-R, CD-RW, DVD-R, DVD-RW, DVD+RW, DVD-RAM, and the like, hereinafter collectively "data storage media". In these formats, data are encoded onto a substrate into a digital data series. In pre-recorded media, such as CD, the data are typically pits and grooves formed on the surface of a plastic substrate through a method such as injection molding, stamping or the like.

In recordable media, the data are encoded by laser, which illuminates an active data layer that undergoes a phase change, thus producing a series of highly-reflecting or non-reflective regions making up the data stream. In these formats, a laser beam first travels through a plastic substrate before reaching the data layer. At the data layer, the beam is either reflected or not, in accordance with the encoded data. The laser light then travels back through the plastic and into an optical detector system where the data are interpreted.

In some applications, it is desirable to have a limited life for an optical disc. For example, sample computer programs are provided to potential customers in order to entice them to purchase the software. The programs are intended to be used for a limited period of time. Additionally, music and movies are currently rented for a limited time period. In each of these applications and others, when that time has expired, the disc must be returned. A need exists for machine-readable optical discs that do not need to be returned at the end of a rental period. Limited-play discs provide a solution to this problem.

Limited play discs have been produced in various fashions. One method comprised forming a disc where the reflective layer is protected with a porous layer such that the reflective layer becomes oxidized over a pre-determined period of time. Once the reflective layer attains a certain level of oxidation, the disc is no longer readable. The problem with this and other limited play techniques is that these techniques are defeatable.

If the method for providing limited play to optical discs can be easily defeated by a customer or a cottage industry, discs would no longer be "limited-play". In the case of a coating or material rendering an optical disc unplayable, for example, facile removal or modification of that coating and/or material could provide a disc with unlimited playability.

Limited play optical discs are disclosed in U.S. Pat. Nos. 6,011,772, 5,815,484, 6,343,063 and 6,338,933 and U.S. patent application Ser. No. 2003/0002431. U.S. Pat. No. 5,815,484 teaches that limited-play optical discs can be made by superimposing a film containing an oxygen sensitive, reduced form of a dye, including methylene blue, over the surface of the data structures on a disc. U.S. Pat. No. 6,343,063 describes the use of barrier layers releasably coupled to discs. U.S. patent application Ser. No. 2003/0002431 discloses placing a reactive layer between a substrate and the laser incident surface of a DVD.

There is a great desire on the part of movie studios to protect their intellectual property. Commercialization of limited-play data storage media that can be easily defeated to afford data storage media with unlimited playability would present an unacceptable risk of losing intellectual property. It is also preferable to develop systems utilizing barrier layers that are not releasably coupled to discs.

BRIEF DESCRIPTION OF THE INVENTION

The present disclosure relates to limited play optical storage media and a method for limiting access to data thereon. This storage media comprises:

a first substrate;

at least one reflective layer;

a data storage layer disposed between said first substrate and said at least one reflective layer;

a reactive layer comprising at least one reactive material disposed on said at least one reflective layer;

an optically transparent second substrate disposed between the reactive layer and a laser incident surface of the optical storage media; and an oxygen permeable barrier layer disposed between the reactive layer and a laser incident surface of the optical storage media, said reactive layer having an initial percent reflectivity of about 50% or greater and a percent reflectivity of about 45% or less after exposure to oxygen.

The method for limiting access to data disposed on the data storage media, comprises: directing light toward at least a portion of said data storage media, wherein at least a portion of said light passes through a barrier layer, a second substrate, and a reactive layer to reach a reflective layer applied to a first substrate having a data storage layer therebetween; reflecting at least a portion of said light back through said reactive layer, said second substrate, and said barrier layer; and reducing the percent reflectivity of said reactive layer to less than about 45%.

DETAILED DESCRIPTION OF THE INVENTION

Figure 1:
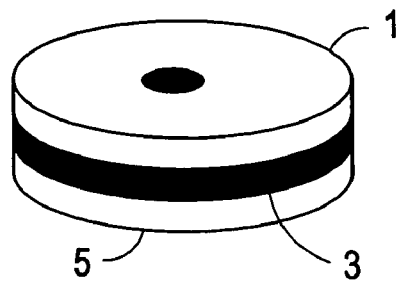
FIG. 1 is an isometric view of a prior art data storage media.

In this specification and in the claims that follow, references will be made to a number of terms that shall be defined to have the following meaning.

The singular forms "a", "an" and "the" include plural references unless the context clearly dictates otherwise.

"Optional" or "optionally" mean that the subsequently described event or circumstance may or may not occur, and includes instances where said event or circumstance occurs and instances where it does not.

"Play-time" is defined as the total time in which the limited-play data storage medium generally plays without error in the playback device.

The method for making limited-play data storage media comprises placing on a reflective layer an optically transparent substrate with a reactive layer in between the substrate and reflective layer, and a UV coating. Upon exposure to oxygen, a reactive material, e.g., leuco methylene blue, which is essentially colorless, is oxidized to form an opaque or semi-opaque layer (e.g., the deep blue dye, methylene blue). Data storage media with the opaque/semi-opaque layer can no longer be played in media players. By adjusting the time it takes to turn opaque, this method can be used to provide limited-play data storage media having the desired play-time for the given application. As described in U.S. patent application Ser. No. 2003/0002431, it has been found that limited-play discs prepared solely with the reactive material layer, in this manner, are easily "defeated", e.g., in a bleach test, so that they are no longer "limited-play". The additional use of an ultra violet (UV) curable topcoat applied to the reactive layer affords limited-play data storage media that cannot be defeated. Furthermore, the barrier layers disclosed here are unlike the prior art films of U.S. Pat. No. 6,343,063 in that they are designed to remain coupled to limited play DVDs.

Furthermore, the UV-curable topcoat described in U.S. patent application Ser. No. 2003/0002431 has an oxygen permeability that is larger than what is required in order to provide the desired play-time of the limited-play storage media. The barrier layer and optically transparent substrate of the present disclosure have substantially decreased oxygen permeability that provide for longer play-times. Furthermore, unlike the topical coatings described in U.S. patent application Ser. No. 2003/0002431 both the barrier layer and reactive layer of the present disclosure can be located internally within the DVD sandwich so that they are no longer easily "defeated".

The play-time for a limited-play data storage medium has been found to be effectively extended through the use of an optically transparent substrate or an optically transparent substrate coated with a barrier layer with an oxygen permeability in a range between about 0.01 Barrers and about 1.35 Barrers at 25° C., where 1 Barrer=$10^{-10}$ cm$^3$(STP)·cm/cm$^2$s·cmHg. The optically transparent substrate is situated between the reactive layer and a laser incident surface and is referred to herein as the "second substrate". Upon exposure to oxygen, a reactive material, e.g., leuco methylene blue, which is essentially colorless, is oxidized to form an opaque or semi-opaque layer (i.e., the deep blue dye, methylene blue). After oxidation, data storage media with the opaque/semi-opaque layer can no longer be played in media players.

By adjusting the time it takes to turn opaque, the reactive layer can be used to provide limited-play data storage media having the desired life for the given application. In the case in which the reactive layer is initially separated from air by a second substrate with thickness of between 0.5 and 0.7 mm, the use of a substrate or substrate with barrier layer having an oxygen permeability in a range between about 0.01 Barrers and about 1.35 Barrers at 25° C. substantially extends the time in which the reactive layer becomes opaque as compared to a data storage medium wherein a second substrate with an oxygen permeability of greater than about 1.35 Barrers is used.

The effectiveness of the second substrate and/or oxygen barrier in extending the time in which the reactive layer becomes opaque depends in part on the rate at which oxygen can diffuse through the second substrate into the reactive dye layer. Oxygen will begin to leak through the second substrate and/or barrier layer after a lag time (Crank, The Mathematics of Diffusion, 2$^{nd}$ ed., Oxford University Press, 1975) approximated by $$L^2/(6D) \quad \text{(Eq 1)}$$

where L is the thickness of the oxygen barrier (second substrate with optional barrier layer) and D is the average diffusion coefficient of oxygen in the second substrate and optional barrier layer. The diffusion coefficient, D, can be obtained from the permeability, P, and the solubility, S, by D=P/S where D is in units of $cm^2/s$ (S is typically about $6.69 \times 10^{-3}$ [cc]/([cc][cmHg]) for oxygen in polycarbonate (Encyclopedia of Polymer Science, vol. VI, pg. 568)). In those instances in which the second substrate thickness is 0.6 mm and the second substrate material is polycarbonate with an oxygen permeability of 1.39 Barrers and diffusivity of $2.1 \times 10^{-8} cm^2/s$, the lag time, and therefore the approximate play-time of the limited-play optical storage medium, is only about 8 hours.

Generally, it is desirable to have a play-time greater than about 24 hours, and even more preferably greater than about 48 hours. Thus, if the diffusivity of the second substrate is reduced to $0.7 \times 10^{-8}$ $cm^2/s$ and permeability is about 0.47 Barrers, assuming that solubility is unchanged, then the lag time becomes about 24 hours. The diffusivity of the second substrate may be reduced by changing the composition of the substrate (e.g., a different polycarbonate) or by applying a barrier layer to the substrate.

In some optical media formats, the thickness of the second substrate can vary from the range specified for DVD. For example, in the proposed Blue-ray video disk, the data layer is separated from air by a 100 micron film. In this case, the permeability of the film or additional barrier layer adjacent to the film would need to be lower to provide an adequate diffusion lag time. For example, with a 100 micron thick polycarbonate film with a permeability of 1.39 Barrers, the lag time is predicted to be 13 min. If a barrier layer is added to the film so as to reduce the permeability to 0.013 Barrers, the lag time is predicted to be 24 hours.

The second substrate preferably possesses low birefringence and high light transmittance at the read laser wavelength, i.e., is readable in an optical media device. Typically, the read laser wavelength is in a range between about 390 nanometers and about 430 nanometers (blue and blue-violet lasers) or in a range between about 630 nanometers and about 650 nanometers (red lasers). The second substrate comprises material having sufficient optical clarity, e.g., a birefringence of about ±100 nm or less, to render the data storage material readable in a media device. In theory, any plastic that exhibits these properties can be employed as the second substrate.

Figure 2:
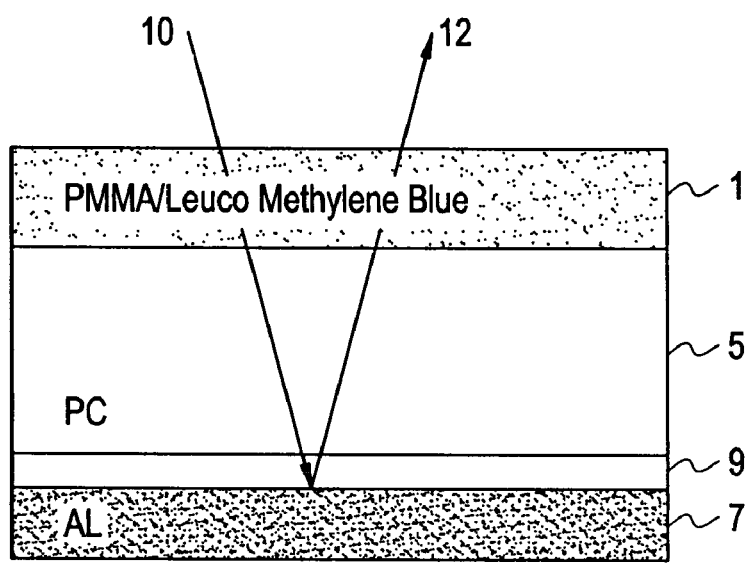
FIG. 2 is a schematic showing incident light and transmitted light passing into and being reflected from an aluminum layer in a data storage media coated with PMMA/leuco methylene blue basecoat.

As demonstrated in FIGS. 1 and 2, conventional data storage media comprise a substrate 5 having low birefringence and high light transmittance at the read laser wavelength, i.e., is readable in an optical media device, a reactive material reactive layer 3, a UV coating 1, a data storage layer 9, and a reflective layer 7. (See FIGS. 1 and 2.)

Figure 6:
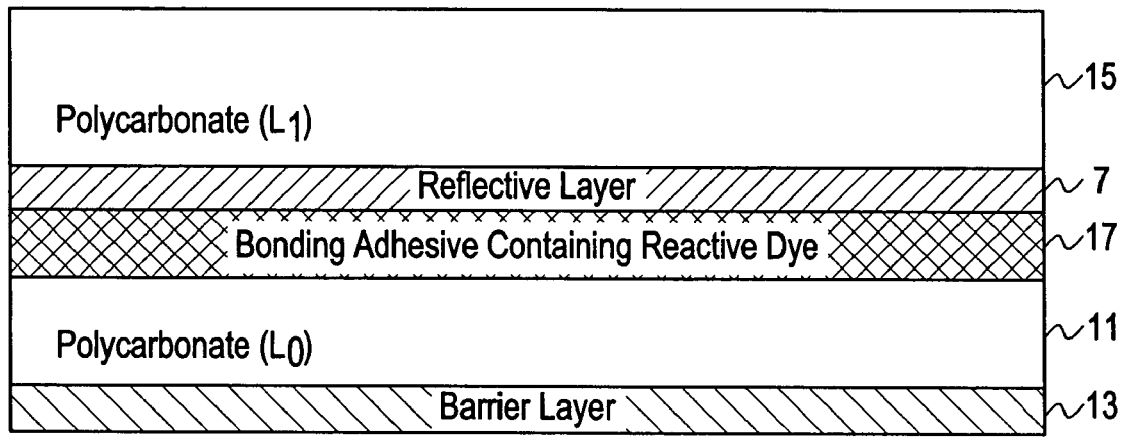
FIG. 6 is a depiction of a reverse-mastered DVD 5 (a one-sided, single-layer disc) with a reactive dye in an adhesive layer between a reflective layer and a second substrate, having a barrier layer applied to the laser incident surface of the second substrate to slow the rate of oxidation of the dye precursor in the reactive material layer.

As depicted in FIG. 6, the DVD of the present disclosure possesses a second substrate layer 11 on a reflective layer 7 with reactive material reactive layer 3 therebetween. Reflective layer 7 is, in turn, applied to first substrate 15. In accordance with the present disclosure, substrate 11 can comprise any material having sufficient optical clarity, e.g., a birefringence of about ±100 nm or less, to render the data storage material readable in a media device. Generally, polycarbonates are employed. In theory, any plastic that exhibits these properties can be employed as the second substrate. However, the plastic should be capable of withstanding the subsequent processing parameters (e.g., application of subsequent layers) such as sputtering temperatures of about room temperature (about 25° C.) up to about 150° C., and subsequent storage conditions (e.g., in a hot car having temperatures up to about 70° C.). That is, it is desirable for the plastic to have sufficient thermal stability to prevent deformation during the various layer deposition steps as well as during storage by the end-user. Possible plastics include thermoplastics with glass transition temperatures of about 100° C. or greater, with about 125° C. or greater preferred, about 150° C. or greater more preferred, and about 200° C. or greater even more preferred (e.g., polyetherimides, polyetheretherketones, polysulfones, polyethersulfones, polyetherethersulfones, polyphenylene ethers, polyimides, polycarbonates, etc.). Most preferred are materials having glass transition temperatures greater than about 250° C., such as polyetherimides in which sulfonedianiline or oxydianiline has been substituted for m-phenylenediamine, among others, as well as polyimides, combinations comprising at least one of the foregoing plastics, and others.

Some possible examples of second substrate materials include, but are not limited to, amorphous, crystalline, and semi-crystalline thermoplastic materials such as: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate (PMMA), methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylenes (e.g., Teflons).

As used herein, the terms "polycarbonate", "polycarbonate composition", and "composition comprising aromatic carbonate chain units" includes compositions having structural units of the formula (I):

(I)

in which at least about 60 percent of the total number of $R^1$ groups are aromatic organic radicals and the balance thereof are aliphatic or alicyclic radicals. Preferably, $R^1$ is an aromatic organic radical and, more preferably, a radical of the formula (II):

$-A^1-Y^1-A^2-$ (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

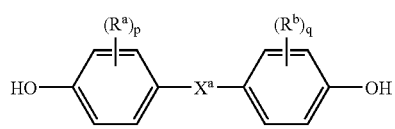

(III)

wherein $R^a$ and $R^b$ each independently represent a halogen atom, or a monovalent hydrocarbon group; p and q are each independently integers from 0 a to 4;and $X^a$ represents one of the groups of formula (IV):

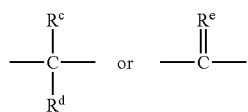

(IV)

wherein $R^c$ and $R^d$ each independently represent a hydrogen atom or a monovalent linear or cyclic hydrocarbon group, and $R^e$ is a divalent hydrocarbon group. Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438.A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-3-methylphenyl) propane (hereinafter "DMBPA"); 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 9,9'-bis(4-hydroxyphenyl) fluorene; 9,9'-bis(4-hydroxy-3-methylphenyl) fluorene; 4,4'-biphenol; and bis(hydroxyaryl) cycloalkanes such as 1,1-bis(4-hydroxyphenyl) cyclohexane and 1,1-bis(4-hydroxy-3-methylphenyl)cyclohexane (hereinafter "DMBPC" or "BCC"); and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid. Polyarylates and polyester-carbonate resins or their blends can also be employed.

Branched polycarbonates are also useful, as well as blends of linear polycarbonate and a branched polycarbonate. The branched polycarbonates may be prepared by adding a branching agent during polymerization. These branching agents are well known and may comprise polyfunctional organic compounds containing at least three functional groups which may be hydroxyl, carboxyl, carboxylic anhydride, haloformyl, and mixtures comprising at least one of the foregoing branching agents. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)α,α(dimethyl benzyl) phenol), 4-chloroformyl phthalic anhydride, trimesic acid, benzophenone tetracarboxylic acid, and the like, as well as combinations comprising at least one of the foregoing branching agents. The branching agents may be added at a level of about 0.05 to about 2.0 weight percent, based upon the total weight of the substrate. Examples of branching agents and procedures for making branched polycarbonates are described in U.S. Pat. Nos. 3,635,895 and 4,001,184. All types of polycarbonate end groups are herein contemplated.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000 atomic mass units, more preferably about 10,000 to about 65,000 atomic mass units, and most preferably about 15,000 to about 35,000 atomic mass units.

In monitoring and evaluating polycarbonate synthesis, it is of particular interest to determine the concentration of Fries product present in the polycarbonate. As noted, the generation of significant Fries product can lead to polymer branching, resulting in uncontrollable melt behavior. As used herein, the terms "Fries" and "Fries product" denote a repeating unit in polycarbonate having the formula (V):

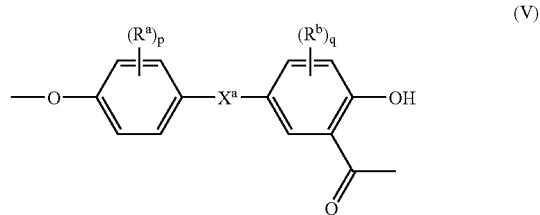

(V)

wherein $X^a$ is a bivalent radical as described in connection with Formula (III) supra.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

In order to aid in the processing of the substrate material (e.g., the production of polycarbonate via a melt process) or to control a property of the substrate material (e.g., viscosity). catalyst(s) may also be employed. Possible catalysts include tetraalkylammonium hydroxide, tetraalkylphosphonium hydroxide, and the like, with diethyldimethylammonium hydroxide, and tetrabutylphosphonium hydroxide preferred. The catalyst(s) can be employed alone or in combination with quenchers such as acids, e.g., as phosphoric acid, and the like. Additionally, water may be injected into the polymer melt during compounding and removed as water vapor through a vent to remove residual volatile compounds.

Data storage media can be produced by first forming the substrate material using a conventional reaction vessel capable of adequately mixing various precursors, such as a single or twin screw extruder, kneader, blender, or the like.

The extruder should be maintained at a sufficiently high temperature to melt the substrate material precursors without causing decomposition thereof. For polycarbonate, for example, temperatures of about 220° C. to about 360° C. can be used, with about 260° C. to about 320° C. preferred. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet, web, or the like, the mixture can optionally be filtered, such as by melt filtering and/or the use of a screen pack, or the like, to remove undesirable contaminants or decomposition products.

Once the plastic composition has been produced, it can be formed into the substrate using various molding and/or processing techniques. Possible techniques include injection molding, film casting, extrusion, press molding, blow molding, stamping, and the like. Once the substrate has been produced, additional processing, such as electroplating, coating techniques (e.g., spin coating, spray coating, vapor deposition, screen printing, painting, dipping, and the like), lamination, sputtering, and the like, as well as combinations comprising at least one of the foregoing processing techniques, may be employed to dispose additional desired layers on the substrate. Typically the substrate has a thickness of up to about 600 microns.

For optical data storage media, additional layers may include a protective layer, reflective layer, dielectric layer, additional dye layer(s) and data storage layer(s), recording layers, and a UV-curable adhesive layer that bonds the substrates. It is understood that the form of the data storage media is not limited to disc shape, but may be any size and shape which can be accommodated in a readout device.

The recordable data storage layer(s) may comprise any material capable of storing retrievable data, such as an optical layer, magnetic layer, or a magneto-optic layer. Typically the data layer has a thickness of up to about 600 Angstroms (Å), with a thickness up to about 300 Å preferred. Possible recordable data storage layers include, but are not limited to, oxides (such as silicone oxide); rare earth elements; transition metal alloys; nickel, cobalt, chromium, tantalum, platinum, terbium, gadolinium, iron, boron, and alloys and combinations comprising at least one of the foregoing; organic dyes (e.g., cyanine or phthalocyanine type dyes); and inorganic phase change compounds (e.g., TeSeSn, InAgSb, and the like).

In recordable media, the data are encoded by laser, which illuminates an active data layer that undergoes a phase change, thus producing a series of highly-reflecting or non-reflective regions making up the data stream. In these formats, a laser beam first travels through the second substrate before reaching the data layer. At the data layer, the beam is either reflected or not, in accordance with the encoded data. The laser light then travels back through the substrate and into an optical detector system where the data are interpreted.

The data layer(s) for an optical application typically is pits, grooves, or combinations thereof on the first substrate layer. Preferably, the data layer is embedded in the first substrate surface. Typically, an injection molding-compression technique produces the first substrate where a mold is filled with a molten polymer as defined herein. The mold may contain a preform, insert, etc. The polymer system is cooled and, while still in at least partially molten state, compressed to imprint the desired surface features, for example, pits and grooves, arranged in spiral concentric or other orientation onto the desired portions of the first substrate, i.e., one or both sides in the desired areas.

The reflective layer is then applied to the first substrate so that the data layer is disposed between the first substrate and the reflective layer.

In an alternative embodiment, such as in DVD-9, a second data layer is embedded into the second substrate surface. A semi-reflective layer is applied to the second substrate so that a second data layer is disposed between the second substrate and the semi-reflective layer.

The protective layer(s), which protect against dust, oils, and other contaminants, can have a thickness of greater than about 100 microns to less than about 10 Å, with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic.

Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing materials.

The dielectric layer(s), which are disposed on one or both sides of the data storage layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); carbides (e.g., silicon carbide); and combinations comprising at least one of the foregoing materials, among other materials compatible within the environment and preferably not reactive with the surrounding layers.

The reflective layer(s) should have a sufficient thickness to reflect a sufficient amount of energy (e.g., light) to enable data retrieval. Typically the reflective layer (s) can have a thickness of up to about 700 Å or so, with a thickness of about 300 Å to about 600 Å generally preferred. Possible reflective layers include any material capable of reflecting the particular energy field, including metals (e.g., aluminum, silver, gold, titanium, and alloys and mixtures comprising at least one of the foregoing metals, and others).

An example of a limited play polycarbonate data storage media comprises an injection molded polycarbonate first substrate. Disposed on the substrate are various layers including: a data layer, dielectric layer(s), a reactive layer(s), a second substrate, a UV layer(s), a reflective layer(s), an oxygen barrier layer, and/or a protective layer, as well as combinations comprising at least one of the foregoing layers.

The reactive layer, which comprises both a carrier and a reactive material, should initially have sufficient transmission to enable data retrieval by the data storage media device, and subsequently form a layer which inhibits data retrieval by that device (e.g., which absorbs a sufficient amount of light i.e., incident and/or reflected light) at the wavelength of the laser in the given device). Typically a layer that allows an initial percent reflectivity from the reflective layer of about 50% or greater can be employed, with an initial percent reflectivity of about 65% or greater preferred, and an initial percent reflection of about 75% or greater more preferred. Once the media has been exposed to oxygen, e.g., air, for a desired period of time (e.g., the desired allowable play time of the media), their reflectivities fall to about 45% or less, with about 20% or less preferred, about 15% or less more preferred, and about 10% or less especially preferred.

In a preferred embodiment, the reactive material in the reactive layer is combined with a carrier material which preferably acts as an adhesive adhering or bonding the reflective layer to the second substrate. Alternatively, the reactive material may be combined with a carrier material and coated to either the reflective layer or second substrate using any of the techniques mentioned above. In this embodiment, the reactive layer is adjacent to the bonding or adhesive layer.

Possible reactive materials include oxygen sensitive leuco or reduced forms of methylene blue, brilliant cresyl blue, basic blue 3, and toluidine 0, as well as reaction products and combinations comprising at least one of the foregoing material; the structures of which are set forth as formulas VI–IX below:

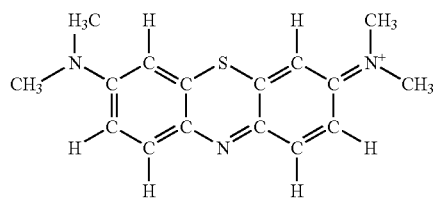

methylene blue (VI)

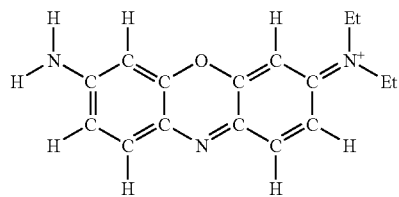

brilliant cresyl blue (VII)

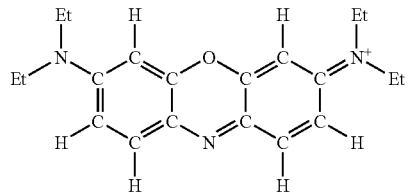

basic blue 3 (VIII)

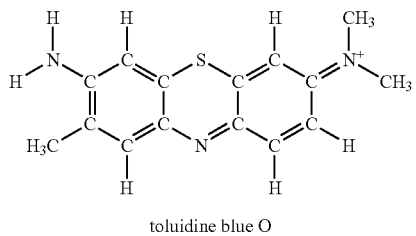

toluidine blue O (IX)

Another possible reactive material comprises a dye which re-oxidizes over approximately 48 hours without a UV coating. The synthesis and oxidation of this dye is shown below:

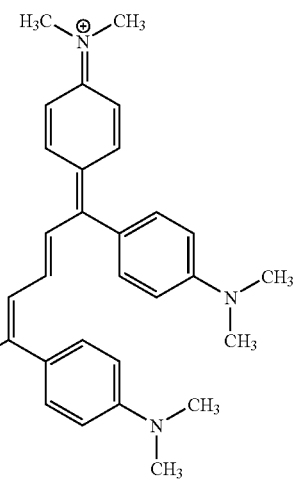

oxidized form

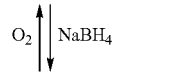

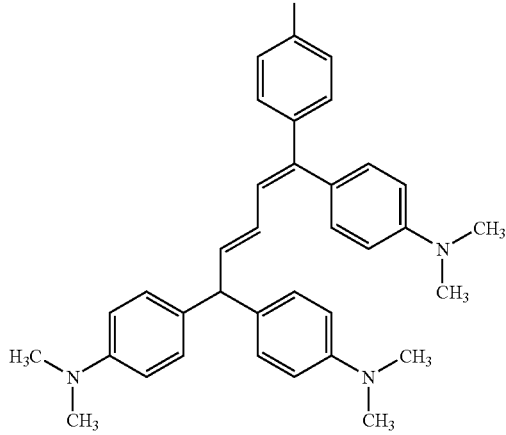

reduced form

The method of synthesis and the oxygen dependent reoxidation to form the colored form of the methylene blue dye is shown below:

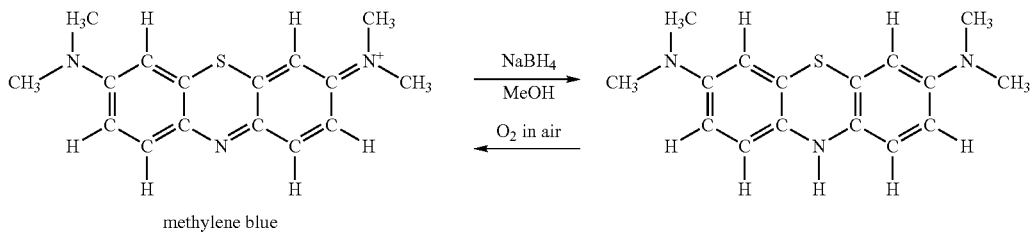

methylene blue

Typically, the critical reflectivity at which the limited play storage medium becomes playable (or unplayable) is less than about 20%, and more typically, the critical reflectivity is less than about 10%.

Additionally, the second substrate may contain dyes to filter the light reaching the reactive layer. Photobleaching resistance may be improved by limiting the wavelengths of light that can be transmitted through the second substrate into the reactive layer. Suitable light filtration may be obtained by incorporating dyes into the second substrate such as those of the chemical family of anthraquinones, perylenes, perinones, indanthrones, quinacridones, xanthenes, oxazines, oxazolines, thioxanthenes, indigoids, thio-indigoids, naphtalimides, cyanines, xanthenes, methines, lactones, coumarins, bis-benzoxaxolylthiophenes (BBOT), napthalenetetracarboxylic derivatives, monoazo and diazo pigments, triarylmethanes, aminoketones, bis(styryl)biphenyl derivatives, and the like, as well as combinations comprising at least one of the foregoing colorants. The light filtering dyes may optionally be combined with oxygen scavenging materials, additives and copolymers from structures (VI), (VII), (VIII), and (IX) that reduce oxygen permeability.

In addition to the above reactive materials, numerous other dyes and light blocking materials can be synthesized to operate to render the data storage media limited play. For example, some other possible reactive materials can be found in U.S. Pat. Nos. 4,404,257 and 5,815,484. The reactive materials can further comprise a mixture comprising at least one of any of the abovementioned reactive materials.

The amount of reactive material in the reactive layer is dependent upon the desired life of the data storage media in combination with the oxygen permeability of the UV coating. For a life of up to about 3 days, the amount of reactive material in the reactive layer can be as little as about 0.1 weight percent (wt %), with about 3 wt % preferred, and about 4 wt % more preferred, based upon the total weight of the reactive layer; with an upper amount of reactive material being about 10 wt %, with about 7 wt % preferred, about 6 wt % more preferred, and about 5 wt % even more preferred.

The desired life of the data storage media depends on the rate at which the reactive material oxidizes to form the laser-light-absorbing dye. The oxidation rate depends on the concentration of reactive material (e.g., leuco dye) and oxygen in the reactive layer. The concentration of oxygen in the reactive layer as a function of time after the data storage media is exposed to air depends on the permeability of oxygen through the barrier layer, the second substrate and the presence or absence of oxygen scavengers.

For example, for the oxidation of leuco methylene blue (LMB) to methylene blue (MB), the rate of oxidation can be described by the following rate equation:

$$d[MB]/dt = k_{eff}[O_2][LMB] \quad (Eq. 2)$$

where $k_{eff}$ is an effective rate coefficient which can depend upon several environmental and chemical factors including, but not limited to, temperature, pressure, acidity, and mobility of the reactants in the reactive-dye layer. The time required for oxygen to diffuse through the barrier layer and the second substrate can be approximated by Equation 1. Thus, the lower the diffusivity and permeability, the longer the diffusion lag time, and the greater the delay before the leuco dye begins to oxidize. The concentration of oxygen $[O_2]$ in the reactive layer can be related back to oxygen diffusivity by solving Fick's Second Law of Diffusion subject to the appropriate boundary conditions at each layer in the media (Crank, The Mathematics of Diffusion, $2^{nd}$ ed., Oxford University Press, 1975). The result for the concentration of oxygen, $[O_2]$, at the interface between the transparent second substrate and the reactive layer for the case in which the reactive dye is in the adhesive is the following:

$$[O_2] = [O_2]_\infty \mathrm{erfc}\{L/(4Dt)^{0.5}\} \quad (Eq. 3)$$

where erfc is the complementary error function, L is the total thickness of the second substrate and optional barrier layer in units of cm, and t is time in units of sec. The diffusivity of oxygen, in units of $cm^2/s$, is assumed to be constant. The concentration of oxygen in the second substrate at equilibrium, $[O_2]_\infty$, can be taken to be the solubility of oxygen in units of mole/L.

The reactive material is preferably mixed with a carrier for deposition on and/or impregnation into at least a portion of the surface of the second substrate. Possible carriers comprise the thermoplastic acrylic polymers, polyester resins, epoxy resins, polythiolenes, UV curable organic resins, polyurethanes, thermosettable acrylic polymers, alkyds, vinyl resins and the like, as well as combinations comprising at least one of the foregoing carriers. Polyesters include, for example the reaction products of aliphatic dicarboxylic acids including, e.g., fumaric or maleic acid with glycols, such as ethyleneglycol, propyleneglycol, neopentylglycol, and the like, as well as reaction products and mixtures comprising at least one of the foregoing.

Some epoxy resins which can be the used as the organic resin include monomeric, dimeric, oligomeric, or polymeric epoxy material containing one or a plurality of epoxy functional groups. For example, reaction products of bisphenol-A and epichlorohydrin, or the epichlorohydrin with phenol-formaldehyde resins, and the like. Other organic resins can be in the form of mixtures of polyolefin and polythiols, such as those disclosed in U.S. Pat. Nos. 3,697,395 and 3,697,402.

Exemplary thermoplastic acrylic polymers are set forth, for example, in Encyclopedia of Polymer Science and Technology, Vol. 1, Interscience Publishers, John Wiley & Sons, Inc., 1964, at pp. 246 et seq. and the references cited therein, and the like, as well as combinations comprising at least one of the foregoing polymers. The term thermoplastic acrylic polymers, as used herein, is meant to embrace within its scope those thermoplastic polymers resulting from the polymerization of one or more acrylic acid ester monomers, as well as methacrylic acid ester monomers. These monomers are represented by the general formula X:

$$CH2=CYCOOR_2 \qquad (X)$$

wherein Y is hydrogen or a methyl radical and $R_2$ is an alkyl radical, preferably an alkyl radical comprising 1 to about 20 carbon atoms. Some nonlimiting examples of alkyl groups represented by $R_2$ include methyl, ethyl, n-propyl, isopropyl, n-butyl, isobutyl, sec-butyl, tert-butyl, pentyl, isopentyl, hexyl, and the like.

Some nonlimiting examples of acrylic acid ester monomers represented by formula X include: methyl acrylate, isopropyl acrylate, n-propyl acrylate, n-butyl acrylate, isobutyl acrylate, 2-ethylhexyl acrylate, and the like. Some nonlimiting examples of methacrylic acid ester monomers represented by formula X include: methyl methacrylate, ethyl methacrylate, butyl methacrylate, hexyl methacrylate, isobutyl methacrylate, propyl methacrylate, and the like, as well as reaction products and combinations comprising at least one of the foregoing; with poly (methyl methacrylate) (PMMA) preferred.

Copolymers of the above acrylate and methacrylate monomers are also included within the term thermoplastic acrylic polymers as it appears herein. The polymerization of the monomeric acrylic acid esters and methacrylic acid esters to provide the thermoplastic acrylic polymers may be accomplished by any of the known polymerization techniques. The thermoplastic acrylic polymers having a weight average molecular weight of about 30,000 g/mol or greater are generally preferred.

In order to enhance adhesion of the reactive layer to the reflective layer and second substrate, a primer may be employed therebetween. Useful thermoplastic acrylic polymers useful as primers include: acrylic homopolymers derived from a single type of acrylic acid ester monomer; methacrylic homopolymers derived from a single type of methacrylic acid ester monomer; copolymers derived from two or more different acrylic acid ester monomers, two or more different methacrylic acid ester monomers, or an acrylic acid ester monomer and a methacrylic acid ester monomer; and the like, as well as combinations comprising at least one of the foregoing primers.

Mixtures of two or more of the previously described thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, and reaction products thereof, can also be used.

Optionally, the reactive layer can be applied to the reflective layer using various coating techniques such as painting, dipping, spraying, spin coating, screen printing, and the like. For example, the reactive layer can be mixed with a relatively volatile solvent, preferably an organic solvent, which is substantially inert towards the polycarbonate, i.e., will not attack and adversely affect the polycarbonate, but which is capable of dissolving the carrier. Generally the concentration of the carrier in the solvent is about 0.5 weight percent (wt %) or greater, with about 1 wt % or greater preferred, while the upper range of the polymer is about 25 wt %, with about 15 wt % preferred. Examples of some suitable organic solvents include ethylene glycol diacetate, butoxyethanol, the lower alkanols, and the like.

The reactive layer may also optionally contain various additives such as flatting agents, surface active agents, thixotropic agents, and the like, and reaction products and combinations comprising at least one of the foregoing additives.

The thickness of the reactive layer is dependent upon the particular reactive material employed, the concentration thereof in the reactive layer, and the desired absorption characteristics of the layer both initially and after a desired period of time. When the reactive material is applied in a coating formulation, the reactive layer can have a thickness as low as about 1 micron (μ), with about 2 μ preferred, and about 3 μ more preferred. On the upper end, the thickness can be up to about 15 μ or greater, with up to about 10 μ preferred, and up to about 6 μ more preferred. When the reactive material is applied in the adhesive layer, the reactive layer can be between 30 and 80 μ, and more preferably between 40 and 60μ.

The amount of light measured at the optical head detector, $I_{initial}$, reflected off of the metalized reflective layer for an uncoated disk or limited-play disk in which the reactive layer is still in the initial, non-light-absorbing state, can be related to the intensity of the laser light incident to the optical disk, $I_0$, by the following equation: $I_{initial}/I_0=R_{initial}$. The reflectivity factor $R_{initial}$ takes into account the inherent reflectivity of the reflective layer as well as any attenuation of the light intensity due to absorption and scattering in any of the layers at time 0. At later times, after the reactive layer is exposed to oxygen, the dye absorbs light, reducing the intensity of light that is reflected back into the optical head detector. The light absorbance, A, in the reactive layer can be calculated using the Beer-Lambert Law:

$$A=-\log(I_f/I_o)=\epsilon cl \qquad (Eq\ 4)$$

where $I_f$ is the light incident to the reactive layer, $\epsilon$ is the molar extinction coefficient of the dye (about 54000 L/mole $_{1}cm^{-1}$ for methylene blue at 650 nm), l is the thickness of the reactive layer, and c is the concentration of the dye which changes with time. Therefore, it can be shown that the reflectivity, R, for a limited-play disk with a light-absorbing reactive layer in which light is absorbed on both passes through the light-absorbing layer, can be approximated by the following relation:

$$R=I/I_o=R_{initial}10^{(-2\epsilon cl)} \qquad (Eq\ 5)$$

Using equation 5, one can calculate the concentration of dye and reactive layer thickness necessary to achieve a specific reflectivity. For example, in the case in which the reactive layer thickness is 3 microns, the dye is methylene blue present in the reactive layer at a concentration of 0.027 mole/L, and the reflectivity of the disk is 70% without the light-absorbing dye, then the predicted reflectivity of the disk with the light-absorbing dye is 10%.

Typically, the reflective layer is deaerated before the reactive layer is disposed on the substrate. Additionally, the reactants used to make the reactive layer are typically kept in an inert environment. After the storage medium has been produced, the disc is typically kept in an inert environment until the disc is ready for use. Typically, deaeration can occur with any inert gas, for example, nitrogen, argon, or helium.

An adhesive layer may also be present which can adhere any combination of the above-mentioned layers. The adhesive layer can comprise any material which is capable of forming a layer penetrable by oxygen and which does not substantially interfere with the transfer of light through the media from and to the data retrieval device (e.g., that is substantially transparent at the wavelength of light utilized by the device, and/or which allows a reflectivity from the media of about 50% or greater, with a percent reflectivity of about 65% or greater preferred and a percent reflectivity of about 75% or greater more preferred). Optionally, the adhesive layer can be the reactive layer, i.e., can contain the oxygen-sensitive dye. Possible adhesive materials include UV materials such as acrylates (e.g., cross-linked acrylates, and the like) epoxies, and the like, as well as reaction products and combinations comprising at least one of the foregoing materials. Other examples of UV materials are described in U.S. Pat. Nos. 4,179,548 and 4,491,508. Some useful monoacrylate monomers include butyl acrylate, hexyl acrylate, dodecyl acrylate and the like while useful polyfunctional acrylate monomers include, for example, diacrylates, triacrylates, tetraacrylates, and combinations of the foregoing.

Although the adhesive layer may contain only one of said polyfunctional acrylate monomers, or a mixture comprising at least one of the polyfunctional acrylate monomers (and the UV light reaction product thereof), preferred coating compositions contain a mixture of two polyfunctional monomers (and the UV light reaction product thereof), with mono-acrylate monomers used in particular instances. Optionally, the adhesive coating can comprise nonacrylic UV curable aliphatically unsaturated organic monomers in amounts up to about 50 weight % of the uncured adhesive coating. Such monomers include, for example, N-vinyl pyrrolidone, styrene, and the like, and reaction products and combinations comprising at least one of the foregoing materials.

Optionally, the adhesive layer may comprise a mixture of polyfunctional acrylate monomers. Exemplary mixtures of diacrylate and triacrylates include mixtures of hexanediol diacrylate with pentaerythritol triacrylate, hexanediol diacrylate with trimethylolpropane triacrylate, diethylene glycol diacrylate with pentaerythritol triacrylate, and diethylene glycol diacrylate with trimethylolpropane triacrylate, and the like.

The adhesive layer can also comprise a photosensitizing amount of photoinitiator, i.e., an amount effective to affect the photocure of the adhesive coating. Generally, this amount comprises about 0.01 weight %, with about 0.1 weight % preferred, up to about 10 weight %, with about 5 weight % preferred, based upon the total weight of the adhesive coating. Possible photoinitiators include blends of ketone-type and hindered amine-type materials that form suitable hard coatings upon exposure to UV radiation. It is preferable that the ratio, by weight, of the ketone compound to the hindered amine compound be in a range between about 80/20 and about 20/80. Typically, about 50/50 or about 60/40 mixtures are satisfactory.

Other possible ketone-type photoinitiators, which preferably are used in a nonoxidizing atmosphere such as nitrogen, include: benzophenone and other acetophenones, benzyl, benzaldehyde and 0-chlorobenzaldehyde, xanthone, thioxanthone, 2-clorothioxanthone, 9,10-phenanthrenenquinone, 9,10-anthraquinone, methylbenzoin ether, ethylbenzoin ether, isopropyl benzoin ether, $\alpha,\alpha$-diethoxyacetophenone, $\alpha,\alpha$-dimethoxyacetophenone, 1-phenyl-1,2-propanediol-2-o-benzoyl oxime, $\alpha,\alpha$-dimethoxy-$\alpha$-phenylacetopheone, phosphine oxides, and the like, including reaction products and combinations comprising at least one of the foregoing photoinitiators.

The adhesive layer may also optionally include flatting agents, surface active agents, thixotropic agents, UV light stabilizers, UV absorbers and/or stabilizers such as resorcinol monobenzoate, 2-methyl resorcinol dibenzoate, and the like, as well as combinations and reaction products comprising at least one of the foregoing. The stabilizers can be present in an amount of at least about 0.1 weight %, preferably about 3 weight %, to about 15 weight %, based upon the weight of the uncured UV layer.

In another embodiment of the present invention a barrier layer is applied to the second substrate prior to bonding to the reflective layer. The reflective layer in turn is bound to a first substrate (and may also include additional layers such as a protective layer, a dielectric layer, etc.). The barrier layer can be applied to the laser-incident surface of the second substrate (sometimes referred to as the (L0) layer) or it can be applied to the second substrate adjacent to the reactive layer. Coating techniques (spin coating, spray coating, vapor deposition, screen printing, inkjet printing, painting, dipping, and the like), lamination, sputtering, plasma deposition techniques, including plasma-enhanced chemical-vapor deposition ("PECVD"), radio-frequency plasma-enhanced chemical-vapor deposition ("RFPECVD"), expanding thermal-plasma chemical-vapor deposition ("ETPCVD"), sputtering including reactive sputtering, electron-cyclotron-resonance plasma-enhanced chemical-vapor deposition (ECRPECVD"), inductively coupled plasma-enhanced chemical-vapor deposition ("ICPECVD"), and the like, as well as combinations comprising at least one of the foregoing processing techniques, may be employed to dispose the barrier layer onto the second substrate, and such techniques may be used to apply additional desired layers on the combination second substrate-barrier layer.

In a preferred embodiment, the barrier layer is applied to the laser-incident ("data") surface of the data storage medium (which, in turn, is already bonded on one side to a reflective layer) after it is bonded, that is, after the adhesive layer bonding the reflective layer and second substrates is UV-cured.

The barrier layer can comprise any coating material which is capable of forming a layer penetrable by oxygen and which does not substantially interfere with the transfer of light through the media from and to the data retrieval device (e.g., that is substantially transparent at the wavelength of light utilized by the device, and/or which allows a reflectivity from the media of about 50% or greater, with a percent reflectivity of about 65% or greater preferred and a percent reflectivity of about 75% or greater more preferred). The terms "barrier layer", or "barrier layer" are used interchangeably and function, to reduce the amount of oxygen reaching the reactive layer, thereby extending the time the limited-play data storage media can be played. Possible barrier layer materials include acrylates (e.g., UV-cured or thermal cross-linked acrylates, and the like) silicon hardcoats, parylene, polyester urethanes, poly(vinylidene) chloride and copolymers thereof, acrylated melamine resins, polyamine/polyepoxides, poly(vinyl alcohol), ethylene-vinyl alcohol copolymer, partially hydrolyzed poly(vinyl acetate), and the like, as well as reaction products and combinations comprising at least one of the foregoing materials. Other examples of barrier materials are described in U.S. Pat. Nos. 4,179,548 and 4,491,508, as well as epoxies, thiol-enes, polyesters, silicones, melamines, polyacetates, poly (vinyl alcohols) and the like, and mixtures thereof. While it can be preferable to use a UV-curable material, thermally cured materials can also be used.

Other barrier materials include metal oxide, nitride or oxinitride coatings that can be deposited from metal-organic, metal-halide, or metal hydride precursors in an environment further containing at least one of $O_2$, $N_2$, NO, $NO_2$, $N_2O$, $H_2$, and $H_2O$. Silicon oxides, nitrides, and oxinitrides, which are one type of metal oxide, nitride or oxinitride, can for example be deposited from silanes, siloxanes, organosilane, an organosilazane, and an organosilicone in an environment further containing at least one of $O_2$, $N_2$, NO, $NO_2$, $N_2O$, $H_2$, and $H_2O$. In addition to reactive gases, one may also provide noble gases, including argon or helium, to the plasma.

Suitable barrier materials also include thin metal films which may be produced using conventional vacuum metalization techniques. Thin metal films comprising, for example, aluminum, silicon, or mixtures thereof are highly effective at lowering the oxygen transmission rate (OTR) as well as the rate of water vapor transmission. As such, thin metal films are particularly well suited for use as barrier materials. Thin metal barrier films will have an optimal thickness for use in limited play applications. For example, where the barrier film consists essentially of aluminum metal, the appropriate thickness for a limited play DVD application will be in a range between about 0.007 and about 0.014 micrometers. Barrier films comprising silicon in the form of silicon dioxide typically have optimal thicknesses in a range between about 0.03 and about 0.04 micrometers. In any event, the thickness of a metallic barrier coating may be tailored to meet the needs of a given limited play application. Because metallic barrier coatings are highly effective, the thickness of such metallic barrier coatings should be carefully monitored and controlled.

The barrier layer is mostly transparent, allowing the transmission of at least about 70% of light to which it is exposed, preferably a transmission of more than 80% of light to which it is exposed.

Some useful polyfunctional acrylate monomers which may be used as the barrier layer include, for example, diacrylates of the formulas:

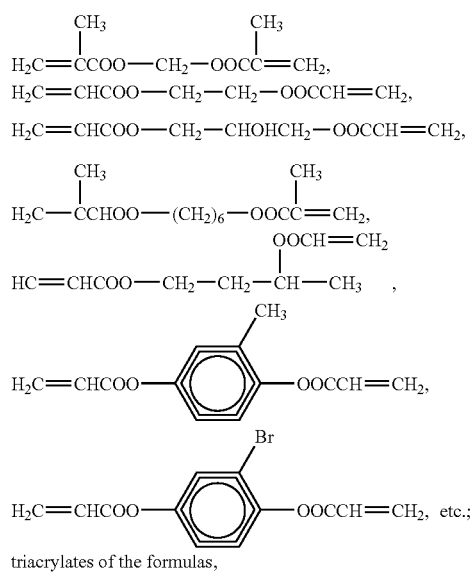

triacrylates of the formulas,

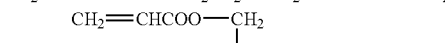
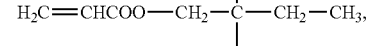
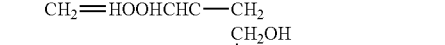
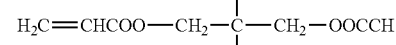
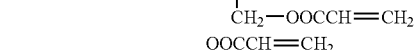

tetraacrylates of the formula,

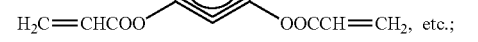
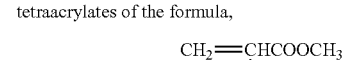
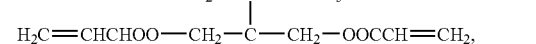
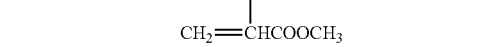

Although the barrier layer may contain only one of said polyfunctional acrylate monomers, or a mixture comprising at least one of the polyfunctional acrylate monomers (and the UV light reaction product thereof), preferred coating compositions contain a mixture of two polyfunctional monomers (and the UV light reaction product thereof), preferably a diacrylate and a triacrylate (and UV light the reaction product thereof), with minor amounts of monoacrylate used in particular instances. Optionally, the UV coating can comprise nonacrylic UV curable aliphatically unsaturated organic monomers in amounts up to about 50 wt % of the uncured UV coating that includes, for example, such materials as N-vinyl pyrrolidone, styrene, and the like, and reaction products and combinations comprising at least one of the foregoing materials.

The barrier layer may also optionally comprise flatting agents, surface active agents, thixotropic agents, UV light stabilizers, UV absorbers and/or stabilizers such as resorcinol monobenzoate, 2-methyl resorcinol dibenzoate, and the like, as well as combinations reaction products comprising at least one of the foregoing. The stabilizers can be present in an amount, based upon the weight of the uncured UV layer of at least about 0.1 wt %, preferably about 3 wt %, to about 15 wt %.

In one embodiment of the present disclosure, limited-play data storage media possess a reactive layer (e.g., a spun-coat poly (methyl methacrylate)/leuco methylene blue coating) between a reflective layer and a polycarbonate substrate and a UV cured barrier layer. Upon initial exposure to oxygen, such a disc was playable. During longer exposure to oxygen, the disc gradually turned blue as the leuco methylene blue was oxidized and ultimately became non-playable. If oxygen could not diffuse through the UV barrier layer and second substrate to the leuco methylene blue in the reactive layer, oxidation of the leuco methylene blue would not occur to form methylene blue which is required for limited playability, as described above. The barrier layer must have a sufficiently high oxygen permeability to allow oxygen to diffuse into the reactive layer thus rendering the limited-play data storage medium unplayable. At the same time, the barrier layer must have a sufficiently low oxygen permeability to protect the reactive layer from prematurely reacting with oxygen thus rendering the medium unplayable too quickly. Based on Equation 1 for a second substrate and barrier layer with total thickness of 0.6 mm, an oxygen permeability range of 0.01 to 1.35 Barrers is preferred and an oxygen permeability range of 0.3 to 0.9 Barrers is even more preferred.

Figure 3:
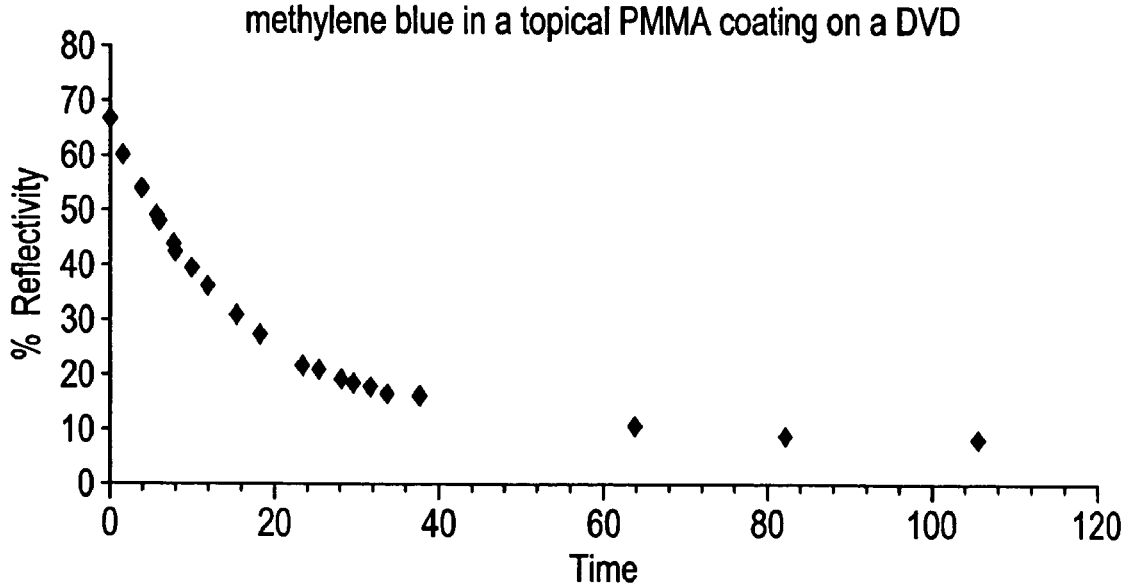
FIG. 3 is a kinetics curve for conversion of leuco methylene blue to methylene blue as measured by percent reflectivity on a data storage media vs. time.

Another benefit of having a UV cured barrier layer or topcoat is as follows. The rate of oxidation of the leuco methylene blue to methylene blue was determined by measuring the percent reflectivity of coated discs. The percent reflectivity is related to the amount of incident light, arrow 10, that is absorbed in passing through several layers, including a PMMA/leuco methylene blue layer, as shown in FIG. 2. The percent reflectivity is the ratio of transmitted light, arrow 12, to incident light. As more methylene blue is formed by oxidation of leuco methylene blue, the amount of light reflected from the reflective surface in a data storage media is reduced since the methylene blue that is formed absorbs some of the incident and reflected light. A typical kinetics curve result is shown in FIG. 3 for a PMMA/leuco methylene blue coating on a data storage media. Ideally for a limited-play data storage media, it would be desirable to have no loss of percent reflectivity for a period of time so that the limited-play data storage media would play impeccably in every type of data storage media player. Alternatively, having a very high percent reflectivity (e.g., an initial percent reflectivity of about 75% or greater), with a maintained percent reflectivity of about 65% or greater for the desired period of time, meets most customer requirements. As shown in FIG. 3, percent reflectivity falls immediately as leuco methylene blue in PMMA is exposed to air.

Figure 4:
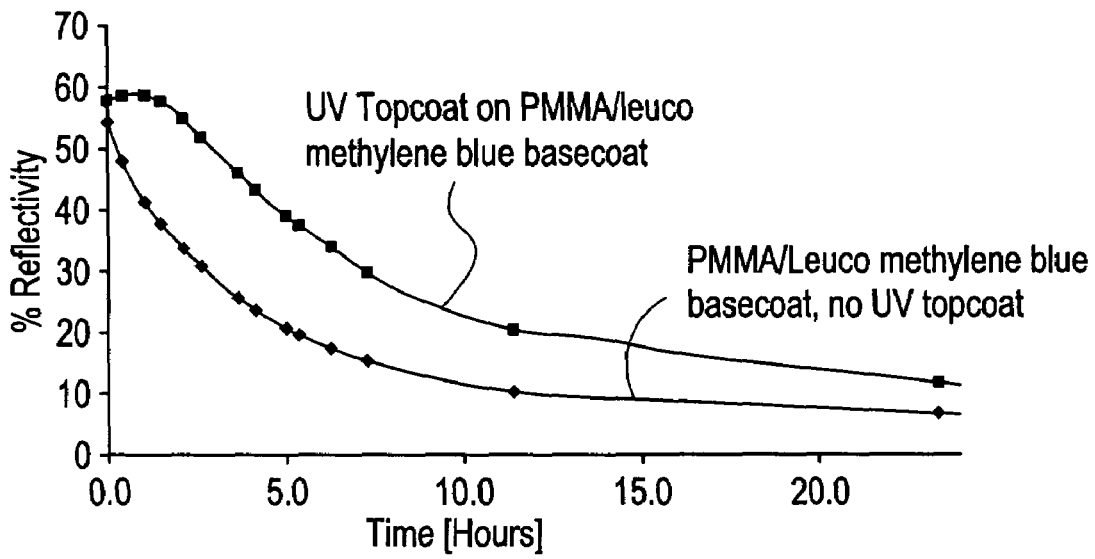
FIG. 4 is a graphical representation of kinetics curves for conversion of leuco methylene blue to methylene blue in PMMA with and without a UV cured topcoat.

It has been found that when a UV topcoat is applied to a PMMA/leuco methylene blue basecoat, the time is extended before the percent reflectivity begins to fall relative to a basecoat that has no topcoat, shown below. Thus high reflectivity is maintained longer so that playability in a data storage media player can be guaranteed for a longer period of time. Specifically, it has been found that some types of DVD players do not play DVDs when the percent reflectivity is 45% or less. As seen in FIG. 4, when there is no UV topcoat on the PMMA/leuco methylene blue basecoat, the percent reflectivity reaches 45% in about 1 to about 2 hours whereas it takes about 4 to about 8 hours when a UV topcoat is present.

Figure 7:
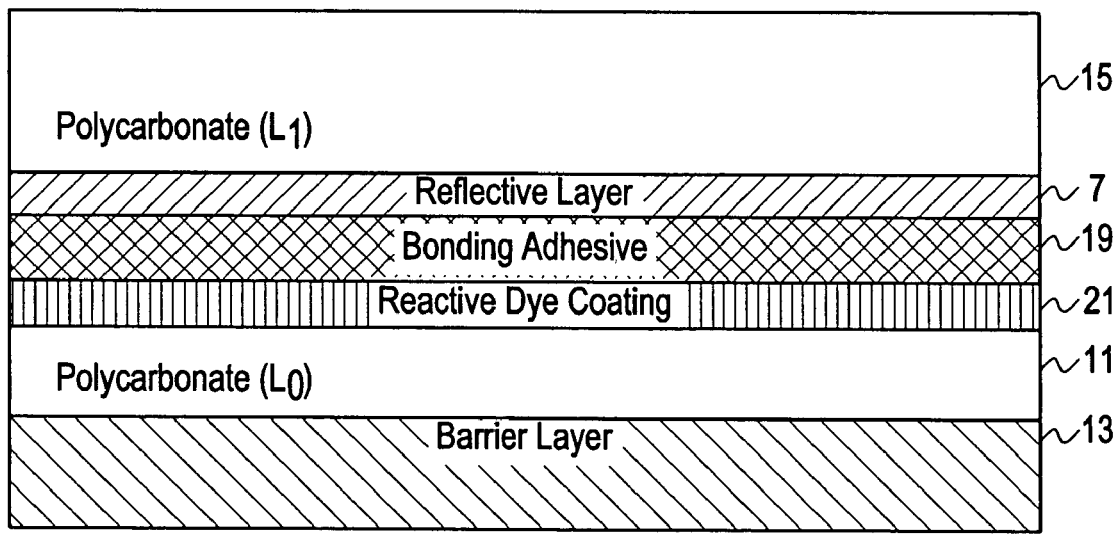
FIG. 7 is an alternate embodiment of the reverse-mastered DVD 5 of FIG. 6, wherein a bonding adhesive is applied to the reflective layer on the first substrate, to which the reactive dye layer is then applied, to which the second substrate and barrier layer is then applied in order to slow the rate of oxidation of the dye precursor in the reactive dye layer.
Figure 8:
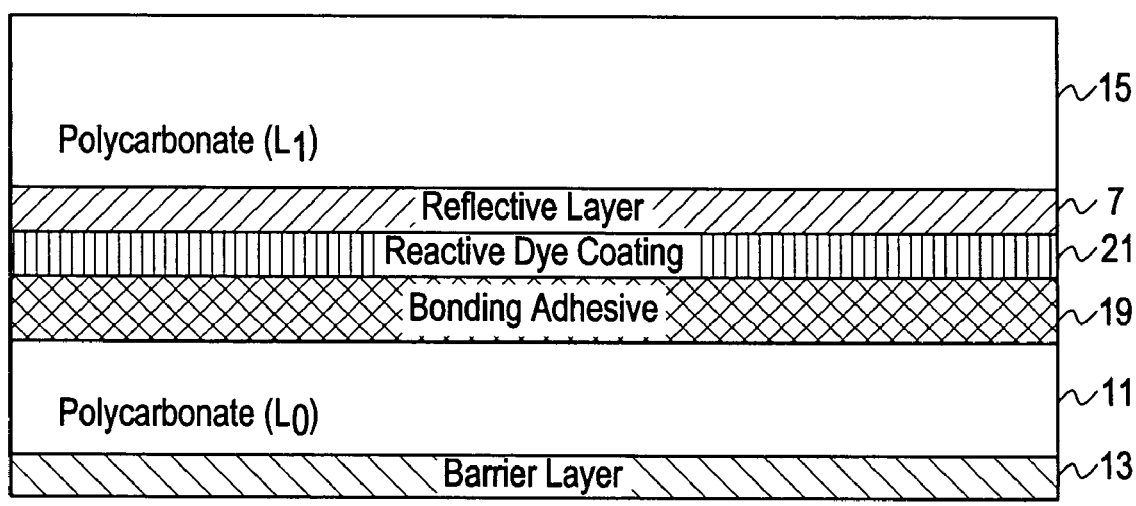
FIG. 8 is an alternate embodiment of the reverse-mastered DVD 5 of FIG. 7, wherein the reactive dye layer is applied to the reflective layer on the first substrate, to which a bonding adhesive is then applied, to which the second substrate and barrier layer is then applied in order to slow the rate of oxidation of the dye precursor in the reactive dye layer.

As described above, a barrier layer could be used with any type of DVD format. For example, a barrier layer 13 could be applied to second substrate 11 on reverse-mastered DVD shown in FIG. 6 wherein the reactive layer is incorporated into an adhesive layer 17. In such a case, the reflective layer 7 is applied to first substrate 15, to which the bonding adhesive containing reactive dye layer 17 is applied. In an alternate embodiment as shown in FIG. 7, a bonding adhesive 19 may be applied to reflective layer 7. A reactive dye layer 21 is then applied to the bonding adhesive 19. The second substrate 11 is then applied to the reactive dye layer 21, and a barrier layer 13 is applied to the laser incident surface of the second substrate 11. In an alternate embodiment as depicted in FIG. 8, the reactive dye layer 21 is applied to reflective layer 7. The bonding adhesive 19 is then applied thereto, to which the second substrate 11 having barrier layer 13 is then applied.

Figure 9:
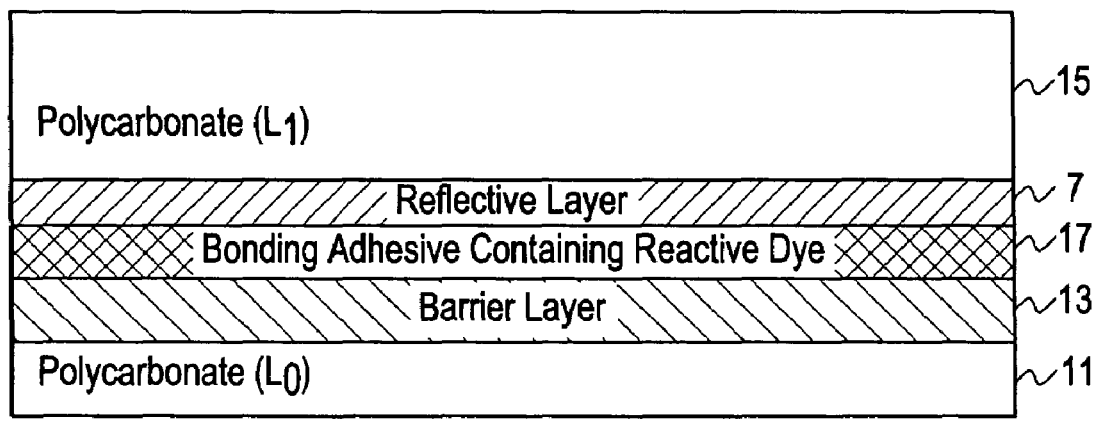
FIG. 9 is an alternate embodiment of the reverse-mastered DVD 5 of FIG. 6, in which the barrier layer is placed between the bonding adhesive containing the reactive dye and the second substrate.
Figure 10:
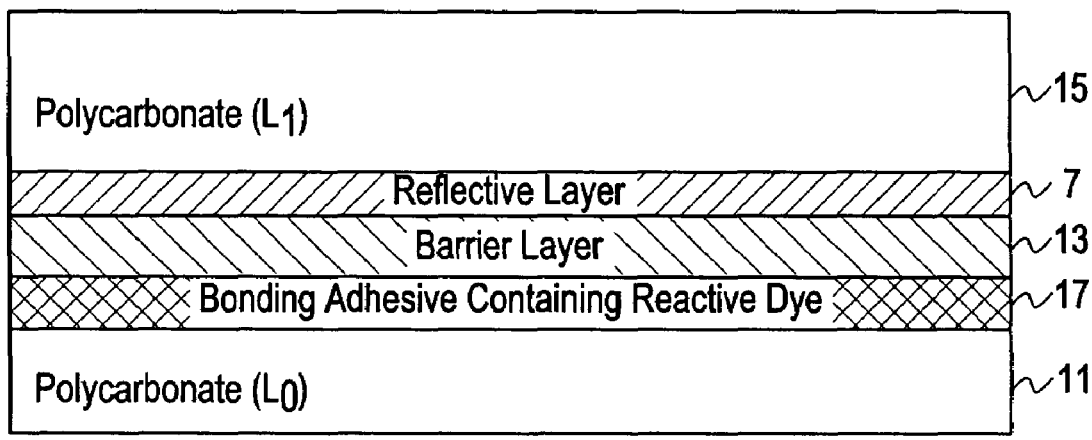
FIG. 10 is an alternate embodiment of the reverse-mastered DVD 5 of FIG. 9, in which the barrier layer is placed between the reflective layer and the bonding adhesive layer containing the reactive dye.
Figure 11:
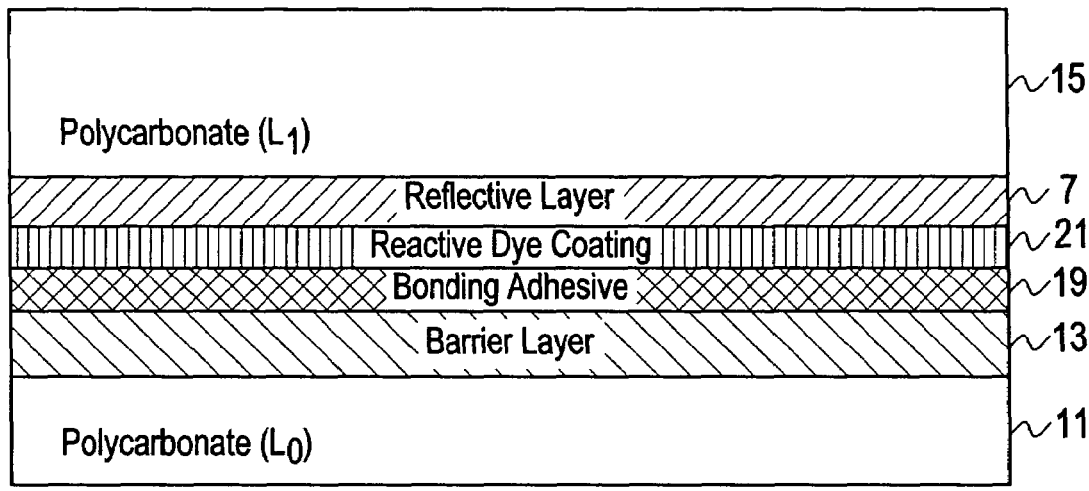
FIG. 11 is an alternate embodiment of the reverse-mastered DVD 5 of FIG. 8, wherein a barrier layer is applied between the bonding adhesive layer and the second substrate.
Figure 12:
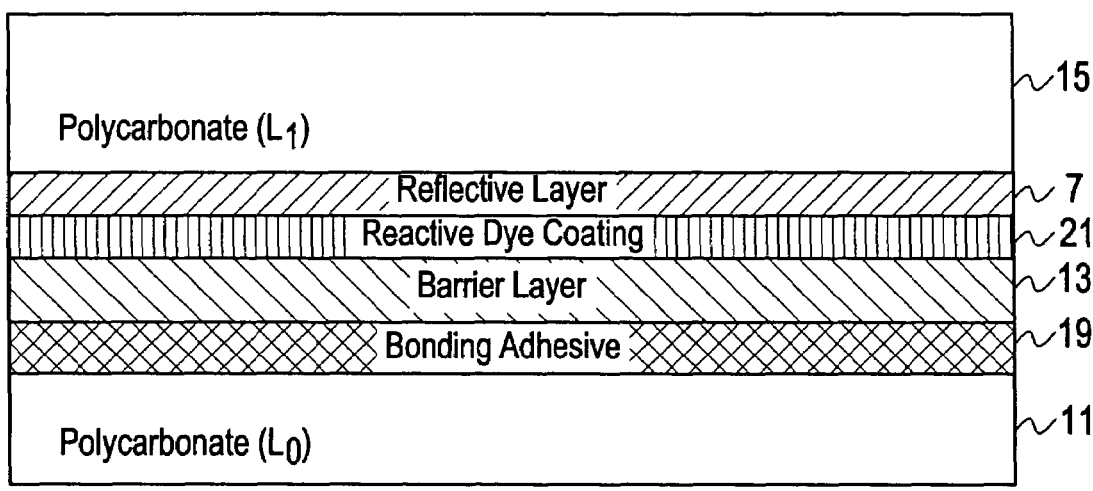
FIG. 12 is an alternate embodiment of the reverse-mastered DVD 5 of FIG. 11, wherein a barrier layer is applied between the bonding adhesive layer and the reactive dye layer.
Figure 13:
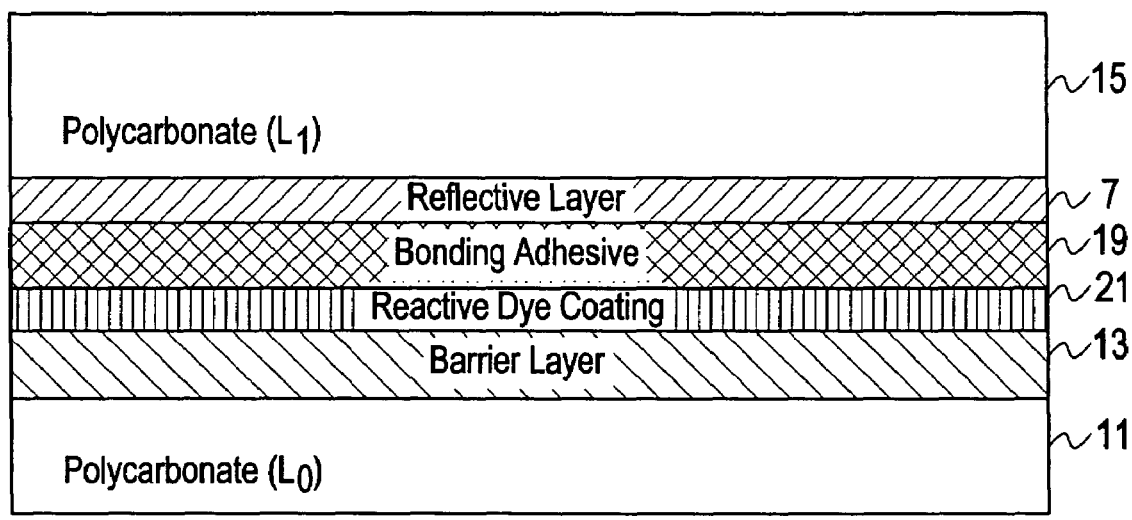
FIG. 13 is an alternate embodiment of the reverse-mastered DVD 5 of FIG. 7, wherein a barrier layer is applied between the reactive dye layer and the second substrate.

Alternate embodiments of these DVDs are set forth in FIGS. 9–13. FIG. 9 is an alternate embodiment of the reverse-mastered DVD 5 of FIG. 6, in which the barrier layer 13 is placed between the bonding adhesive containing the reactive dye layer 17 and the second substrate 11. FIG. 10 is an alternate embodiment of the reverse-mastered DVD 5 of FIG. 9, in which the barrier layer 13 is placed between the reflective layer 7 and the bonding adhesive layer containing the reactive dye layer 17. FIG. 11 is an alternate embodiment of the reverse-mastered DVD 5 of FIG. 8, wherein a barrier layer 13 is applied between the bonding adhesive layer 19 and the second substrate 11. FIG. 12 is an alternate embodiment of the reverse-mastered DVD 5 of FIG. 11, wherein a barrier layer 13 is applied between the bonding adhesive layer 19 and the reactive dye layer 21. FIG. 13 is an alternate embodiment of the reverse-mastered DVD 5 of FIG. 7, wherein a barrier layer 13 is applied between the reactive dye layer 21 and the second substrate 11.

Figure 14:
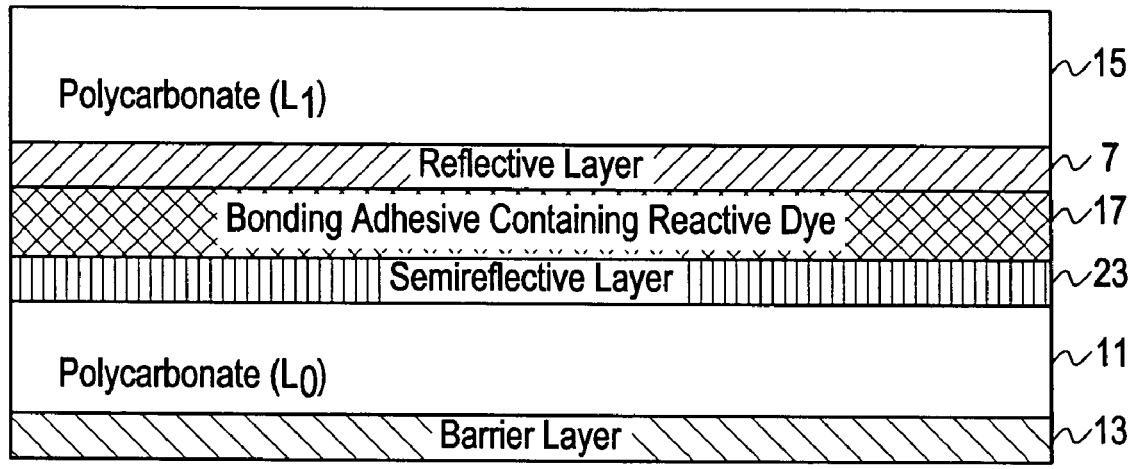
FIG. 14 is a depiction of a limited play DVD 9 having a reflective layer on a first substrate; a bonding adhesive containing a reactive dye applied thereto; a semireflective layer applied to the bonding adhesive containing reactive dye; a second substrate applied thereto; and a barrier layer applied to the laser incident surface of the second substrate to slow the rate of oxidation of the dye precursor in the reactive dye layer.
Figure 15:
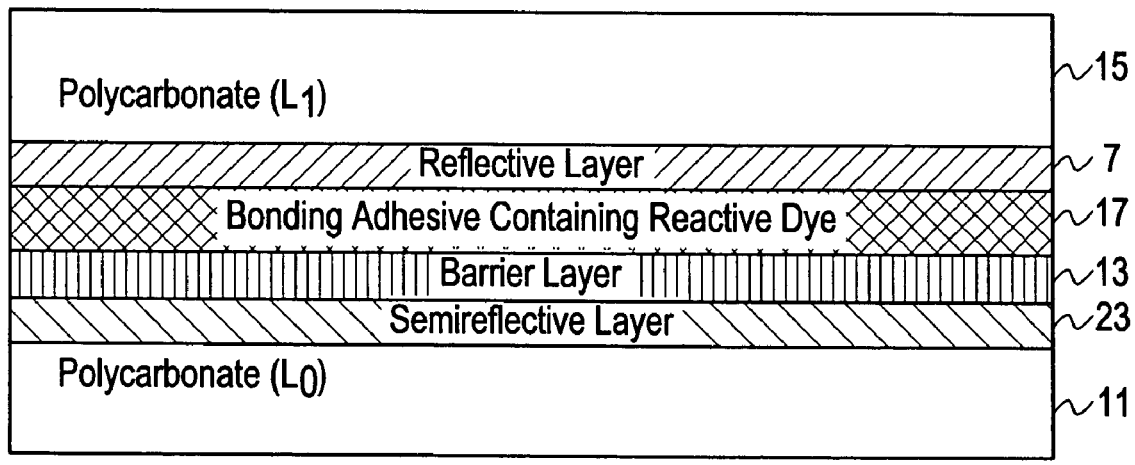
FIG. 15 is an alternate embodiment of the limited play DVD 9 of FIG. 14 wherein the barrier layer is placed between the bonding adhesive containing reactive dye and the semi reflective layer.

In addition, the present disclosure may have applications with other formats, such as limited play DVD 9. FIG. 14 is a DVD 9 in accordance with the present disclosure having a reflective layer 7 on a first substrate 15; a bonding adhesive containing a reactive dye layer 17 applied thereto; a semi-reflective layer 23 applied to the bonding adhesive containing reactive dye layer 17; a second substrate applied thereto 11; and a barrier layer 13 applied to the laser incident surface of the second substrate 11 to slow the rate of oxidation of the dye precursor in the reactive dye layer. FIG. 15 is an alternate embodiment of the limited play DVD 9 of FIG. 14 wherein the barrier layer 13 is placed between the bonding adhesive containing reactive dye layer 17 and the semireflective layer 23.

In order that those of ordinary skill in the art will be better able to practice the present invention, the following examples of reactive adhesive layer formulations are given by way of illustration, and not by way of limitation:

EXAMPLE 1

This example describes preparation of PMMA/leuco methylene blue coating solution. A solution of PMMA in 1-methoxy-2 propanol was prepared by adding 60 grams of Elvacite 2010 poly (methyl methacrylate) from Ineos Acrylics to 300 grams of 1-methoxy-2 propanol in a bottle and rolling on a roller mill to effect dissolution. The solution was transferred to a flask and heated to about 80° C. while a slow stream of nitrogen was passed over the surface of the solution. The de-aerated solution was transferred using nitrogen pressure to a de-aerated bottle closed with a rubber septum using a cannula tube.

A leuco methylene blue solution was prepared by combining 1.2 grams of methylene blue trihydrate and 0.80 grams of camphor sulfonic acid with 40 grams of 1-methoxy-2 propanol in a 100-mL flask equipped with a rubber septum. The stirred mixture was heated in a 90° C. water bath while a stream of nitrogen was passed into the flask using syringe needles for both the nitrogen inlet and outlet. While hot, 4.2 milliliters (mL) of tin (II) 2-ethylhexanoate was added by syringe to reduce the methylene blue to the dark amber leuco methylene blue. To the solution was added 0.6 mL of polyether modified poly-dimethylsiloxane (BYK-301 from BYK Chemie).

To make the PMMA/leuco methylene blue coating solution, the leuco methylene blue solution above was drawn into a syringe and then injected into the PMMA solution after having been passed through a 0.2-micron syringe filter.

EXAMPLE 2

This example illustrates the preparation of a prior art disc with the PMMA//leuco methylene blue layer. Approximately 3 mL of the Example 1 PMMA/leuco methylene blue coating solution was applied as a ring around the inner diameter of a DVD held on a spin coater. After spin coating at 500 rpm for 60 seconds, the coating was tack-free and essentially colorless (e.g., a percent reflectivity of about 65%). The disc was placed a DVD player and was completely playable.

EXAMPLE 3

The coated disc from Example 2 was allowed to stand at ambient room conditions during which time average percent reflectivity was measured at various times using a Dr. Schenk PROmeteus, model MT-136E optical disc tester. As the percent reflectivity dropped the color of the disc turned from essentially colorless to blue.

After the disc had been in air for about 1 week, it was very blue and would not play in a DVD player; e.g., the disc had a percent reflectivity of about 10%.

EXAMPLE 4

This example illustrates preparation of a coated DVD disc in accordance with the present disclosure. A solution was prepared as in Example 1 except the following quantities of raw materials were used. Note: Elvacite 2008 is a low molecular weight version of poly (methyl methacrylate).

|  | grams |
|---|---|
| PMMA Solution | |
| Dowanol PM | 579.0 |
| Total Elvacite | 157.5 |
| Elvacite 2008 | 118.1 |
| Elvacite 2010 | 39.4 |
| Dye Solution | |
| methylene trihydrate | 8.09 |
| camphorsulfonic acid | 3.02 |
| Dowanol PM | 161.21 |
| stannous octanoate | 18.74 |
| BYK-301 | 1.58 |

The solution was used to apply a PMMA/leuco methylene blue basecoat to a DVD in the same manner as in Example 2 except the discs were spun at 500 rpm for 3 seconds and then at 1,000 rpm for 7 seconds. The average coating thickness was 2.6 microns.

After one of the discs with the PMMA/leuco methylene blue basecoat had been stored overnight in a nitrogen chamber, UV resin, a mixture of acrylates commonly known as Daicure SD-640 (commercially available from DaiNippon, Inc., and Dic Trading, USA, Fort Lee, N.J.) was applied to it in the manner described in Example 2, spun at 1,000 rpm for 3 seconds, and passed under a UV lamp in a UV curing station on a DVD coating line.

The kinetics of oxidation of a disc with just the topical coating containing the PMMA/leuco methylene blue basecoat and that of another with the UV topcoat applied on the basecoat were determined in the manner of Example 3. The results are shown in FIG. 4.

The use of a UV coating in combination with a reactive material can be used to make a variety of limited-use optical media devices by adjusting the thickness/density of the UV coating, the period of playability of the disc can be adjusted as desired. In addition, a reactive dye coating, such as PMMA/leuco methylene blue can be applied to either of the 2 substrates prior to bonding of the DVD as shown in FIG. 7. The barrier layer can then be applied to the bonded DVD as a topical coating as shown in FIG. 7 or on top of the reactive layer prior to bonding of the DVD.

EXAMPLE 5

This Example illustrates the preparation of DVD bonding adhesive containing triisopropylsilyloxycarbonyl leuco methylene blue.

Part A:
7.49 g SR238 diacrylate (Sartomer; 1,6-hexanediol diacrylate)
20.03 g SR495 acrylate (Sartomer; caprolactone acrylate)
2.505 g SR440 acrylate (Sartomer; isooctyl acrylate)
0.46 g Tinuvin 292 (Ciba Geigy)
0.80 g Irgacure 819 (Ciba Geigy)
polyhydroxystyrene (ChemFirst; PHS-8E01)
2,4-dihydroxybenzoic acid Part B:
0.7 g TIPSOCLMB
10.0 g SR339 acrylate (Sartomer; phenoxyethyl acrylate)

Part C:
2.0 g Sn(II) 2-ethylhexanoate (Aldrich)

The DVD bonding adhesive was an air-sensitive composition including three parts (A, B and C) that were mixed together within a few hours of use. Part A was prepared by first blending the Sartomer monomers SR351 and SR495 at room temperature with gentle stirring in air, followed by the dissolution of the polyhydroxystyrene powder (PHS-8E01) with stirring and warming to 60° C. for about one hour. Under subdued lighting conditions, the Irgacure 819 was next added and stirring and heating were continued for about one-half hour. The powder and the total mixture were handled with subdued or yellow filtered light from this point forward. Finally, the Tinuvin 292 was added and the mixture was briefly stirred in the dark until homogeneous (about ten minutes). Part A was relatively stable and could be stored in the dark at room temperature for several months before use.

Part B was prepared by adding Sartomer SR339PI that had been stored over molecular sieves into a clean dry amber glass bottle followed by the addition of triisopropylsilyloxycarbonyl leuco methylene blue (hereinafter "TIPSO-CLMB") powder. After sealing the bottle, the mixture was stirred for approximately one hour at room temperature. This solution had a limited shelf life (about 1–2 months), and was stored in dry conditions in the dark at room temperature or below (it was relatively stable at −20° C.).

Part C was prepared by adding stannous ethylhexanoate (Aldrich Sn(II) 2-ethylhexanoate) to an appropriately sized container.

Within a few hours of preparation, the three parts of the DVD bonding adhesive were mixed together using the following procedure. The Part B container was opened and the entire weight of Part C was added via a syringe. The Part B container (now containing Part C) was then closed and shaken vigorously for 30 seconds. The Part A container was then opened and the entire contents of the Part B container were added. The Part A container was then closed and shaken vigorously for 1 minute, and then placed into a Sonifier bath for 15 minutes. The DVD bonding adhesive was used within 4 hours of mixing.

The following samples were prepared using the DVD bonding adhesive and bonding process described above. In the following examples, unless indicated otherwise, GE Lexan polycarbonate was used to mold the DVD substrates. After bonding, the DVDs were stored in Nitrogen overnight, packaged in oxygen impermeable bags, and placed in a 55° C. oven for 24 hours to substantially convert the TIPSO-CLMB to leuco methylene blue. The DVDs were then stored in the packages until ready to use.

EXAMPLE 6

The following coating solutions were prepared:
A. 10% poly(vinyl alcohol) in water
B. 10% poly vinyl acetate (40% hydrolyzed) in water
C. 10% Elvacite 2008 poly(methyl methacrylate) in Dowanol PM
D. 10% Elvacite 2042 poly(ethyl methacrylate) in Dowanol PM
E. Daicure SD-698

DVDs were prepared using the reactive bonding adhesive containing TIPSOCLMB prepared in Example 5 above. The laser-incident surfaces of the bonded DVDs were then coated with each of the coating solutions listed above (5A–5E) using the following procedure. The DVD was centered data side up on a laboratory spin-coater. The disc was held stationary while the coating solution was dispensed on the data side in a manner creating a uniform circular ring of material at about 30–40 mm diameter from the center of the disc. After a few seconds, the disc was spun at 500 to 1000 rpm for about 30 to 60 seconds to level the coating and to remove excess material. In Example 5E, where a UV-curable acrylate Daicure SD-698 was used as the coating, the coated disc was cured for about 2 seconds using a flash UV lamp (Xenon Corporation RC742) with a lamp distance of about 1.5 inches.

EXAMPLE 7

A silicon nitride coating having a thickness of about 30 nm was formed on a polycarbonate substrate using the PECVD technique and tested for water vapor and oxygen transmission. Silane dilute to 2% in Helium (maximum flow rate of about 500 standard $cm^3$/minute), and ammonia (maximum flow rate of about 60 standard $cm^3$/minute) were used to produce the silicon nitride coating in a reactor comprising two parrellel electrodes, i.e. bottom and top electrode. The substrate was placed on the bottom electrode and radio-frequency (13.MHz) power was supplied to the bottom electrode. The power fed to the bottom electrode was about 300 W when plasma was generated in the mixture of silane, Helium and ammonia. The vacuum level in the reactor was about 0.2 mm Hg and the average temperature was about 55° C. The coating was deposited at a deposition rate larger around 30 nm/min.

Oxygen transmission measurement was performed using a MOCON Inc. Ox-TRAN 1000 tester, in which 100% partial pressure of oxygen was maintained on one side of the coated substrate while 0% partial pressure was maintained on the other side by flushing with a dry nitrogen flow, which was subsequently analyzed for traces of oxygen that transmitted through the coated film. The moisture transmission rate was measured using a MOCON Inc. Permatran-600 tester, which operates similarly as the Ox-TRAN 1000 tester but maintained 100% relative humidity on one side of the film. The tests were performed at room temperature. The oxygen transmission rate through the coated substrate was reduced by over two orders of magnitude compared to the uncoated substrate, i.e. from 400 cc/m2/day to less than 1 cc/m2/day.

To make a limited-play DVD, approximately 3 mL of a UV-curable adhesive containing TIPSOCLMB was applied as a ring around the inner diameter of a metallized polycarbonate half-disc held on a spin coater as described above in Example 5. The polycarbonate half-disc with the silicon nitride coating was placed on top of the ring of adhesive such that the polycarbonate surface contacted the adhesive. After spinning at 1000 rpm for 15 seconds, the disc was exposed to pulsed xenon lamp for 2 seconds in order to cure the adhesive.

To measure the kinetics of the oxidation reaction (conversion of leuco methylene blue to methylene blue in the reactive adhesive), the DVDs prepared in Examples 6 and 7 were removed from packaging and percent reflectivity was measured using a Dr. Schenk PROmeteus MT-136E optical disc tester. The discs were allowed to stand in ambient conditions and the % reflectivity was measured periodically. As the % reflectivity decreased the color of the discs turned from essentially colorless to blue. The times required to reach 10% reflectivity are shown below.

| Disc Coating | Initial % Reflectivity | Time to 10% Reflectivity [hours] |
|---|---|---|
| None (control) | 45.3 | 6.8 |
| Example 5A | 44.9 | >60 |
| Example 5B | 54.9 | 7.6 |
| Example 5C | 57.7 | 7.9 |
| Example 5D | 53.5 | 7.8 |
| Example 5E | 67.1 | 19.4 |
| Example 7 | 65.8 | >60 |

It can be seen that the barrier layers (Examples 5A–5E and 7) increased the amount of time required to reach 10% reflectivity by from above 1 hour to over 50 hours. These results were very surprising given the aforedescribed result. Undoubtedly the amount of time to reach 10% reflectivity can be controlled by the thickness and composition of these barrier layers.

EXAMPLE 9

The following samples were prepared similarly to the above-referenced samples except that the DVD bonding adhesive used the following formulation.

Part A:
10.65 g SR351 triacrylate (Sartomer; trimethylolpropane triacrylate)
21.29 g SR495 acrylate (Sartomer; caprolactone acrylate)
0.124 g Tinuvin 292 (Ciba Geigy)
0.86 g Irgacure 819 (Ciba Geigy)
5.0 g polyhydroxystyrene (ChemFirst; PHS-8E01)

Part B:
0.8 g TIPSOCLMB (Flexplay)
9.3 g SR339 acrylate (Sartomer; phenoxyethyl acrylate)

Part C:
2.0 g Sn(II) 2-ethylhexanoate (Aldrich)

DVDs were bonded using GE Lexan polycarbonate. In Example 9A (control), no barrier layer was applied to the DVD. In Examples 9B and 9C, the DVDs were bonded, then Daicure SD698 was spun-coated onto the second (L0) substrate (surface) of the DVD and UV-cured for 6 sec (Example 9B) and 24 sec (Example 9C). In Examples 9D and 9E, the barrier layer was applied to the L0 substrate in a layer adjacent to the bonding adhesive. These examples illustrate one embodiment of the present invention in which the barrier layer can be "sandwiched" between the reactive layer and the L0 substrate as well as or instead of being applied to the surface of the L0 substrate. Daicure SD698 was spun-coated onto the L0 substrate and UV-cured for 6 sec (Example 9D) and 24 sec (Example 9E). The DVDs were then bonded using the reactive adhesive, orienting the barrier layer so as to be adjacent to the bonding adhesive. The DVDs were bonded using an additional UV exposure of 6 sec. Therefore, the barrier layer was exposed to a total UV-cure of 12 sec (Example 9D) and 30 sec (Example 9E). Following bonding, disks were packaged in Nitrogen, aged in a 55° C. oven for 24 hours and exposed to air. The discs were allowed to stand in ambient conditions and the % reflectivity was measured periodically. The times required to reach 10% reflectivity are shown below and in FIG. 5.

| Disc Coating | Initial % Reflectivity | Time to 10% Reflectivity [hours] |
|---|---|---|
| Example 9A (control) | 67.3 | 21.8 |
| Example 9B | 61.0 | 45.5 |
| Example 9C | 62.6 | 52.8 |
| Example 9D | 68.3 | 57.5 |
| Example 9E | 68.0 | 62.0 |

Figure 5:
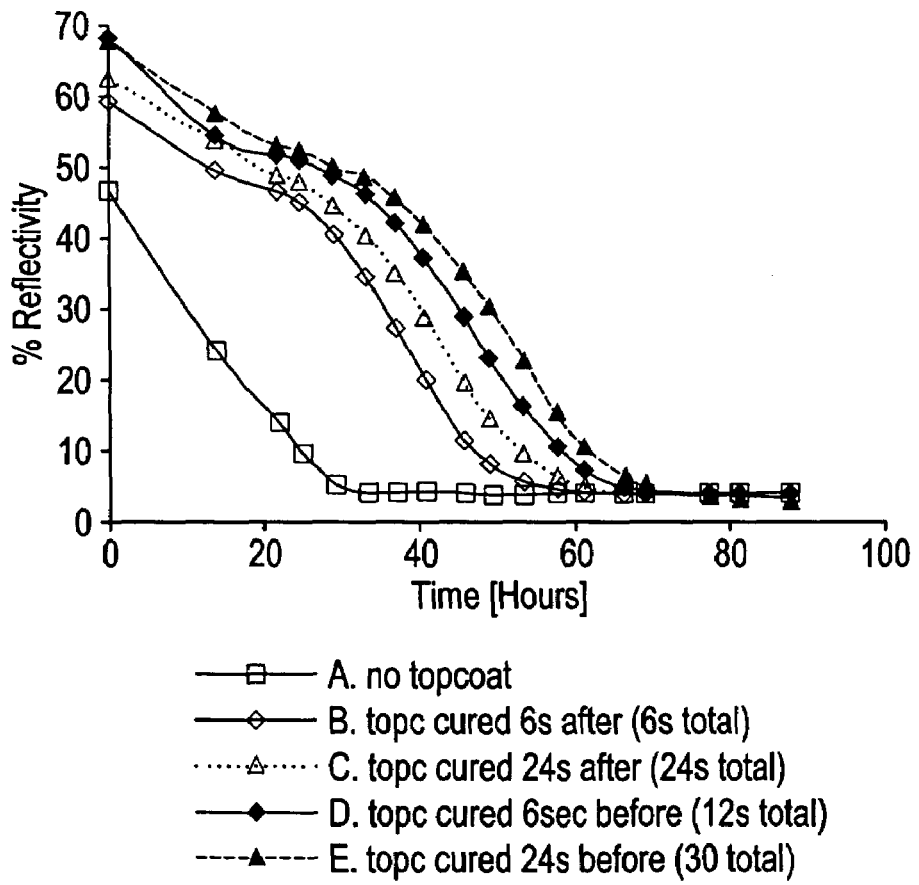
FIG. 5 is a graphical representation of kinetics curves for conversion of leuco methylene blue to methylene blue comparing samples with and without barrier layers.

It can be seen in FIG. 5 that the barrier layers (Examples 9B–9E) increase the amount of time required to reach 10% reflectivity by 23 to over 40 hours. These results are very surprising given that the composition and thickness of the barrier layers are similar. Undoubtedly the amount of time to reach 10% reflectivity can be controlled by the position of the barrier layers (on the DVD surface or adjacent to the reactive layer) and by the degree of cure (UV exposure time) of the UV-curable acrylate coatings.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

The invention claimed is:

1. A limited play optical storage media, comprising:
a first substrate;
at least one reflective layer;
a data storage layer disposed on a side of said reflective layer opposite that of said first substrate;
a reactive layer comprising at least one reactive material disposed on said at least one reflective layer;
an adhesive layer incorporated into the reactive layer or provided as a separate layer between the reactive layer and the second substrate;
an optically transparent second substrate disposed between the reactive layer and a laser incident surface of the optical storage media; and
an oxygen permeable barrier layer disposed on an outer surface of said second substrate of the optical storage media,
said reactive layer having an initial percent reflectivity of about 50% or greater and a percent reflectivity of about 45% or less after exposure to oxygen.

2. A limited play optical storage media as in claim 1, wherein the oxygen permeable barrier layer is disposed between the reflective layer and the second substrate.

3. A limited play optical storage media as in claim 1, wherein said first substrate and said second substrate are plastic.

4. A limited play optical storage media as in claim 3, wherein said plastic comprises at least one thermoplastic having a glass transition temperature of about 100° C. or greater.

5. A limited play optical storage media as in claim 4, wherein said thermoplastic is selected from the group consisting of polyvinyl chloride, polyolefins, polyesters, polyamides, polysulfones, polyimides, polyetherimides, polyether sulfones, polyphenylene sulfides, polyether ketones, polyether ether ketones, ABS resins, polystyrenes, polybutadiene, polyacrylates, polyacrylonitrile, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene, and mixtures, copolymers, reaction products, and composites comprising at least one of the foregoing thermoplastics.

6. A limited play optical storage media as in claim 4, wherein said thermoplastic comprises polycarbonate.

7. A limited play optical storage media as in claim 1, wherein said barrier layer is selected from the group consisting of acrylates, silicon hardcoats, parylene, polyester urethanes, poly(vinylidene) chloride and copolymers thereof, acrylated melamine resins, polyamine/polyepoxides, poly(vinyl alcohol), ethylene-vinyl alcohol copolymer, partially hydrolyzed poly(vinyl acetate), epoxies, thiolenes, polyesters, silicones, melamines, polyacetates, poly(vinyl alcohols) metal oxides, metal nitrides, metal oxinitrides, and combinations thereof.

8. A limited play optical storage media as in claim 7, wherein said barrier coating comprises thermal cross linked acrylates.

9. A limited play optical storage media as in claim 7, wherein said barrier coating comprises diacrylate, a triacrylate, N-vinyl pyrrolidone, styrene, and combinations thereof.

10. A limited play optical storage media as in claim 1, wherein said reactive layer further comprises a reactive material selected from the group consisting of oxygen sensitive leuco methylene blue, reduced forms of methylene blue, brilliant cresyl blue, basic blue 3, toluidine 0, and combinations comprising at least one of the foregoing reactive materials.

11. A limited play optical storage media as in claim 1, wherein said reactive layer further comprises polymethylmethacrylate/leuco methylene blue.

12. A limited play optical storage media as in claim 1, wherein said reactive layer further comprises about 0.1 wt % to about 10 wt % reactive material, based upon a total weight of said reactive layer.

13. A limited play optical storage media as in claim 12, wherein said reactive layer further comprises about 3 wt % to about 7 wt % reactive material, based upon a total weight of said reactive layer.

14. A limited play optical storage media as in claim 13, wherein said reactive layer further comprises about 4 wt % to about 6 wt % reactive material, based upon a total weight of said reactive layer.

15. A limited play optical storage media as in claim 1, wherein said reactive layer further comprises a carrier selected from the group consisting of thermoplastic acrylic polymers, polyester resins, epoxy resins, polythiolenes, UV curable organic resins, polyurethanes, thermosettable acrylic polymers, alkyds, vinyl resins, and reaction products and combinations comprising at least one of the foregoing carriers.

16. A limited play optical storage media as in claim 1, wherein said subsequent percent reflectivity is about 30% or less.

17. A limited play optical storage media as in claim 1, wherein said reactive layer acts as an adhesive adhering the reflective layer to the second substrate.

18. A limited play optical storage media as in claim 1 wherein the second substrate and the barrier layer combined have an oxygen permeability in a range between about 0.01 Barrers and about 1.35 Barrers at 25° C.

19. A limited play optical storage media, comprising:
a first substrate;
at least one reflective layer;
a data storage layer disposed on a side of said reflective layer opposite that of said first substrate;
a reactive layer disposed on said at least one reflective layer, said reactive layer comprising polymethylmethacrylate!leuco methylene blue;
an adhesive layer incorporated into the reactive layer or provided as a separate layer between the reactive layer and the second substrate;
an optically transparent second substrate disposed between the reactive layer and a laser incident surface of the optical storage media; and
an oxygen permeable barrier layer disposed on an outer surface of said second substrate of the optical storage media,
said reactive layer having an initial percent reflectivity of about 50% or greater and a percent reflectivity of about 45% or less after exposure to oxygen.

20. A limited play optical storage media as in claim 19 wherein the second substrate and the barrier layer combined have an oxygen permeability in a range between about 0.01 Barrers and about 1.35 Barrers at 25° C.

21. A method for limiting access to data disposed on a data storage media, comprising:
directing a light towards at least a portion of said data storage media, wherein at least a portion of said light passes through a barrier layer, an optically transparent second substrate, a reactive layer, and an adhesive layer incorporated into the reactive layer or provided as a separate layer between the reactive layer and the second substrate, to reach a reflective layer applied to a first substrate having a data storage layer opposite that of the first substrate;
reflecting at least a portion of said light back through said first substrate, said reactive layer, said second substrate, and said barrier layer; and
reducing the percent reflectivity of said reactive layer to less than about 45% after exposure to oxygen.

22. A method for limiting access to data disposed on a data storage media as in claim 21, wherein the step of reducing the percent reflectivity of said reactive layer results in a percent reflectivity about 30% or less.

23. A method for limiting access to data disposed on a data storage media as in claim 22, wherein the step of reducing the percent reflectivity of said reactive layer results in a percent reflectivity about 20% or less.

24. A method for limiting access to data disposed on a data storage media as in claim 23, wherein the step of reducing the percent reflectivity of said reactive layer results in a percent reflectivity about 15% or less.

25. A method for limiting access to data disposed on a data storage media as in claim 21, wherein the step of directing a light towards at least a portion of said data storage media involves directing light towards a data storage media containing a first substrate and a second substrate comprising a thermoplastic selected from the group consisting of polyvinyl chloride, polyolefins, polyesters, polyamides, polysulfones, polyimides, polyetherimides, polyether sulfones, polyphenylene sulfides, polyether ketones, polyether ether ketones, ABS resins, polystyrenes, polybutadiene, polyacrylates, polyacrylonitrile, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene, and mixtures, copolymers, reaction products, and composites comprising at least one of the foregoing thermoplastics.

26. A method for limiting access to data disposed on a data storage media as in claim 21, wherein the step of directing a light towards at least a portion of said data storage media involves directing light towards a data storage media containing a first substrate and a second substrate comprising a polycarbonate.

27. A method for limiting access to data disposed on a data storage media as in claim 21, wherein the step of directing a light towards at least a portion of said data storage media involves directing light towards a data storage media containing a barrier layer selected from the group consisting of acrylates, silicon hardcoats, parylene, polyester urethanes, poly(vinylidene) chloride and copolymers thereof, acrylated melamine resins, polyamine/polyepoxides, poly(vinyl alcohol), ethylene-vinyl alcohol copolymer, partially hydrolyzed poly(vinyl acetate), epoxies, thiol-enes, polyesters, silicones, melamines, polyacetates, poly(vinyl alcohols) metal oxides, metal nitrides, metal oxinitrides, and combinations thereof.

28. A method for limiting access to data disposed on a data storage media as in claim 21, wherein the step of directing a light towards at least a portion of said data storage media involves directing light towards a data storage media containing a reactive layer further comprising a reactive material selected from the group consisting of oxygen sensitive leuco methylene blue, reduced forms of methylene blue, brilliant cresyl blue, basic blue 3, toluidine 0, and combinations comprising at least one of the foregoing reactive materials.

29. A method for limiting access to data disposed on a data storage media as in claim 21, wherein the step of directing a light towards at least a portion of said data storage media involves directing light towards a data storage media containing a reactive layer further comprising polymethylmethacrylate/leuco methylene blue.

30. A method for limiting access to data disposed on a data storage media as in claim 21, wherein the step of directing a light towards at least a portion of said data storage media involves directing light towards a data storage media containing a reactive layer further comprising about 0.1 wt % to about 10 wt % reactive material, based upon a total weight of said reactive layer.

31. A method for limiting access to data disposed on a data storage media as in claim 30, wherein the step of directing a light towards at least a portion of said data storage media involves directing light towards a data storage media containing a reactive layer further comprising about 3 wt % to about 7 wt % reactive material, based upon a total weight of said reactive layer.

* * * * *